US011134451B2

(12) United States Patent
Ouchi et al.

(10) Patent No.: US 11,134,451 B2
(45) Date of Patent: Sep. 28, 2021

(54) TERMINAL APPARATUS AND METHOD

(71) Applicants: Sharp Kabushiki Kaisha, Sakai (JP); FG Innovation Company Limited, New Territories (HK)

(72) Inventors: Wataru Ouchi, Sakai (JP); Tomoki Yoshimura, Sakai (JP); Shoichi Suzuki, Sakai (JP); Liqing Liu, Sakai (JP)

(73) Assignees: FG Innovation Company Limited, Hong Kong (HK); Sharp Kabushiki Kaisha, Osaka (JP)

(*) Notice: Subject to any disclaimer, the term of this patent is extended or adjusted under 35 U.S.C. 154(b) by 10 days.

(21) Appl. No.: 16/606,283

(22) PCT Filed: Apr. 24, 2018

(86) PCT No.: PCT/JP2018/016621
§ 371 (c)(1),
(2) Date: Oct. 18, 2019

(87) PCT Pub. No.: WO2018/199098
PCT Pub. Date: Nov. 1, 2018

(65) Prior Publication Data
US 2021/0195532 A1    Jun. 24, 2021

(30) Foreign Application Priority Data

Apr. 28, 2017   (JP) .............................. JP2017-089790

(51) Int. Cl.
*H04B 17/318*    (2015.01)
*H04W 52/24*    (2009.01)

(52) U.S. Cl.
CPC ........ *H04W 52/245* (2013.01); *H04B 17/318* (2015.01)

(58) Field of Classification Search
CPC .......................... H04W 52/245; H04B 17/318
USPC ....................................................... 455/522, 69
See application file for complete search history.

(56) References Cited

U.S. PATENT DOCUMENTS

| 8,588,259 | B2* | 11/2013 | Papasakellariou | ...... H04L 27/20 |
| | | | | 370/535 |
| 9,451,639 | B2* | 9/2016 | Li | ..................... H04W 74/0833 |
| 9,629,165 | B2* | 4/2017 | Bertrand | ........... H04W 74/0833 |
| 9,769,811 | B2* | 9/2017 | Lee | ..................... H04J 11/0079 |
| 9,949,298 | B1* | 4/2018 | Akoum | ............. H04W 74/0833 |

(Continued)

OTHER PUBLICATIONS

"3rd Generation Partnership Project; Technical Specification Group Radio Access Network; Study on Scenarios and Requirements for Next Generation Access Technologies; (Release 14)", 3GPP TR 38.913 V14.0.0, Oct. 2016, pp. 1-39.

*Primary Examiner* — Hai V Nguyen
(74) *Attorney, Agent, or Firm* — Imperium Patent Works

(57) ABSTRACT

A terminal apparatus in an initial access calculates, from the RSRP of the SS block, a downlink path loss used for transmission power of the PRACH, and determines a reference used for the downlink path loss used for transmission power of a first PUSCH scheduled by a random access response grant, based on system information included in the random access response grant, wherein the system information further includes a first parameter for indicating a subcarrier spacing for the first PUSCH and a second parameter for indicating a signal waveform for the first PUSCH.

2 Claims, 4 Drawing Sheets

(56) References Cited

U.S. PATENT DOCUMENTS

| | | | |
|---|---|---|---|
| 10,057,916 B2* | 8/2018 | Barabell | H04W 72/1263 |
| 10,314,082 B2* | 6/2019 | Akoum | H04W 74/006 |
| 10,411,795 B2* | 9/2019 | Liu | H01Q 1/246 |
| 10,448,423 B2* | 10/2019 | Babaei | H04W 72/14 |
| 10,536,959 B2* | 1/2020 | Barabell | H04W 72/046 |
| 10,542,562 B2* | 1/2020 | Amuru | H04J 11/0079 |
| 10,548,039 B2* | 1/2020 | Park | H04W 24/10 |
| 10,548,096 B2* | 1/2020 | Papasakellariou | H04W 52/08 |
| 10,568,146 B2* | 2/2020 | Akoum | H04B 7/0408 |
| 10,708,088 B2* | 7/2020 | Park | H04W 52/24 |
| 10,728,823 B2* | 7/2020 | Cheng | H04W 74/008 |
| 10,736,046 B2* | 8/2020 | MolavianJazi | H04W 52/50 |
| 10,813,137 B2* | 10/2020 | Shih | H04W 74/0833 |
| 10,820,352 B2* | 10/2020 | Ishii | H04W 48/12 |
| 10,833,760 B2* | 11/2020 | Liu | H04W 48/18 |
| 10,863,380 B2* | 12/2020 | Babaei | H04W 72/1284 |
| 10,873,911 B2* | 12/2020 | Dinan | H04W 52/281 |
| 10,917,825 B2* | 2/2021 | Peisa | H04W 36/0088 |
| 10,939,382 B2* | 3/2021 | Zhou | H04W 52/44 |
| 10,959,186 B2* | 3/2021 | Yasukawa | H04W 52/362 |
| 10,966,191 B2* | 3/2021 | Xu | H04W 72/1289 |
| 10,973,046 B2* | 4/2021 | Kim | H04L 5/0053 |
| 2013/0176953 A1* | 7/2013 | Stern-Berkowitz | H04W 52/281 370/329 |
| 2013/0322383 A1* | 12/2013 | Dinan | H04W 72/0426 370/329 |
| 2014/0369297 A1* | 12/2014 | Bertrand | H04W 40/08 370/329 |
| 2015/0016312 A1* | 1/2015 | Li | H04W 74/006 370/280 |
| 2015/0230210 A1* | 8/2015 | Lee | H04L 5/0007 370/329 |
| 2016/0037550 A1* | 2/2016 | Barabell | H04B 17/318 455/450 |
| 2016/0242123 A1* | 8/2016 | Harada | H04W 52/0206 |
| 2017/0013565 A1* | 1/2017 | Pelletier | H04W 52/365 |
| 2017/0223732 A1* | 8/2017 | Bertrand | H04W 52/04 |
| 2017/0366996 A1* | 12/2017 | Park | H04W 24/10 |
| 2018/0007574 A1* | 1/2018 | Park | H04B 7/04 |
| 2018/0132168 A1* | 5/2018 | Ingale | H04W 48/12 |
| 2018/0219606 A1* | 8/2018 | Ng | H04L 5/0053 |
| 2018/0262313 A1* | 9/2018 | Nam | H04L 5/0044 |
| 2018/0269962 A1* | 9/2018 | Liu | H04W 48/18 |
| 2018/0270699 A1* | 9/2018 | Babaei | H04W 72/1284 |
| 2018/0270700 A1* | 9/2018 | Babaei | H04W 72/1284 |
| 2018/0270713 A1* | 9/2018 | Park | H04W 74/0833 |
| 2018/0270791 A1* | 9/2018 | Park | H04W 8/24 |
| 2018/0270792 A1* | 9/2018 | Park | H04W 76/28 |
| 2018/0270869 A1* | 9/2018 | Tsai | H04W 76/27 |
| 2018/0279229 A1* | 9/2018 | Dinan | H04W 52/367 |
| 2018/0279358 A1* | 9/2018 | Babaei | H04W 72/0453 |
| 2018/0288810 A1* | 10/2018 | Ishii | H04W 48/12 |
| 2018/0310257 A1* | 10/2018 | Papasakellariou | H04W 72/1289 |
| 2018/0323850 A1* | 11/2018 | Baligh | H04B 7/024 |
| 2018/0324850 A1* | 11/2018 | Amuru | H04L 5/0053 |
| 2018/0324863 A1* | 11/2018 | Akoum | H04B 7/0408 |
| 2018/0352561 A1* | 12/2018 | Barabell | H04W 72/046 |
| 2018/0368075 A1* | 12/2018 | Chen | H04W 72/042 |
| 2019/0149365 A1* | 5/2019 | Chatterjee | H04L 5/0094 370/329 |
| 2019/0174571 A1* | 6/2019 | Deenoo | H04W 76/11 |
| 2019/0182884 A1* | 6/2019 | Deenoo | H04L 1/0061 |
| 2019/0190747 A1* | 6/2019 | Park | H04B 7/0639 |
| 2019/0199554 A1* | 6/2019 | Park | H04W 52/32 |
| 2019/0208482 A1* | 7/2019 | Tooher | H04L 5/005 |
| 2019/0230696 A1* | 7/2019 | Kim | H04W 72/1278 |
| 2019/0254077 A1* | 8/2019 | Sahlin | H04L 5/0037 |
| 2019/0254079 A1* | 8/2019 | Akoum | H04W 74/006 |
| 2019/0281588 A1* | 9/2019 | Zhang | H04W 52/08 |
| 2019/0306801 A1* | 10/2019 | Zhou | H04W 52/04 |
| 2019/0313343 A1* | 10/2019 | MolavianJazi | H04W 52/44 |
| 2019/0313348 A1* | 10/2019 | MolavianJazi | H04W 52/08 |
| 2019/0372806 A1* | 12/2019 | Park | H04W 52/32 |
| 2019/0386737 A1* | 12/2019 | Liu | H04W 16/14 |
| 2019/0387546 A1* | 12/2019 | Li | H04L 27/26025 |
| 2020/0015236 A1* | 1/2020 | Kung | H04B 17/336 |
| 2020/0029238 A1* | 1/2020 | Si | H04L 5/10 |
| 2020/0045730 A1* | 2/2020 | Babaei | H04W 72/0453 |
| 2020/0045745 A1* | 2/2020 | Cirik | H04W 76/27 |
| 2020/0053607 A1* | 2/2020 | Ingale | H04L 5/005 |
| 2020/0074988 A1* | 3/2020 | Park | G06N 3/08 |
| 2020/0084698 A1* | 3/2020 | Rune | H04W 48/10 |
| 2020/0084704 A1* | 3/2020 | Agiwal | H04W 48/12 |
| 2020/0092901 A1* | 3/2020 | Barabell | H04W 72/1263 |
| 2020/0100286 A1* | 3/2020 | Xu | H04L 1/1887 |
| 2020/0100299 A1* | 3/2020 | Loehr | H04W 72/0446 |
| 2020/0100311 A1* | 3/2020 | Cirik | H04W 72/042 |
| 2020/0106573 A1* | 4/2020 | Cirik | H04W 74/0833 |
| 2020/0107235 A1* | 4/2020 | Peisa | H04W 36/0061 |
| 2020/0107369 A1* | 4/2020 | Jeon | H04W 74/0833 |
| 2020/0137695 A1* | 4/2020 | Papasakellariou | H04W 72/1289 |
| 2020/0187246 A1* | 6/2020 | Amuru | H04L 5/0053 |
| 2020/0213067 A1* | 7/2020 | Cirik | H04L 1/1819 |
| 2020/0221494 A1* | 7/2020 | Nakamura | H04W 74/006 |
| 2020/0221506 A1* | 7/2020 | Jeon | H04W 74/0833 |
| 2020/0236574 A1* | 7/2020 | Ohuchi | H04B 7/0626 |
| 2020/0252880 A1* | 8/2020 | Lei | H04W 52/36 |
| 2020/0252974 A1* | 8/2020 | Akkarakaran | H04W 72/0473 |
| 2020/0259612 A1* | 8/2020 | Nakamura | H04L 27/26 |
| 2020/0266950 A1* | 8/2020 | Hwang | H04W 72/005 |
| 2020/0267730 A1* | 8/2020 | Kim | H04W 72/0453 |
| 2020/0287753 A1* | 9/2020 | Park | H04W 52/32 |
| 2020/0296635 A1* | 9/2020 | Rastegardoost | H04W 36/0077 |
| 2020/0296697 A1* | 9/2020 | Hwang | H04W 74/0833 |
| 2020/0296765 A1* | 9/2020 | Kim | H04W 74/0833 |
| 2020/0305197 A1* | 9/2020 | Kim | H04W 72/0446 |
| 2020/0314812 A1* | 10/2020 | Xu | H04L 5/0051 |
| 2020/0314913 A1* | 10/2020 | Rastegardoost | H04W 74/04 |
| 2020/0344723 A1* | 10/2020 | Babaei | H04L 1/1874 |
| 2020/0345969 A1* | 11/2020 | Choi | G16H 40/60 |
| 2020/0351729 A1* | 11/2020 | Rastegardoost | H04W 36/0072 |
| 2020/0351955 A1* | 11/2020 | Jeon | H04W 76/27 |
| 2020/0367174 A1* | 11/2020 | MolavianJazi | H04W 52/08 |
| 2020/0396744 A1* | 12/2020 | Xiong | H04W 56/001 |
| 2020/0413452 A1* | 12/2020 | Ishii | H04W 48/12 |
| 2021/0051736 A1* | 2/2021 | Jeon | H04W 76/11 |
| 2021/0105739 A1* | 4/2021 | Lin | H04W 76/11 |
| 2021/0105813 A1* | 4/2021 | Lee | H04W 74/085 |
| 2021/0105820 A1* | 4/2021 | Kim | H04W 74/0891 |
| 2021/0105828 A1* | 4/2021 | Agiwal | H04L 5/001 |
| 2021/0112501 A1* | 4/2021 | Dinan | H04W 74/0833 |

* cited by examiner

TERMINAL APPARATUS AND METHOD

TECHNICAL FIELD

Embodiments of the present invention relate to a technique of a terminal apparatus and a method that realize efficient communication.

This application claims priority to JP 2017-089790 filed on Apr. 28, 2017, the contents of which are incorporated herein by reference.

BACKGROUND ART

3rd Generation Partnership Project (3GPP), a standardization project, has completed standardization of Evolved Universal Terrestrial Radio Access (EUTRA), which has realized high-speed communication by employing Orthogonal Frequency-Division Multiplexing (OFDM) communication scheme as well as flexible scheduling using a predetermined unit of frequency and time called a resource block. Communication employing the standardization technique in EUTRA may be generally referred to as Long Term Evolution (LTE).

Moreover, 3GPP is studying Advanced EUTRA (A-EUTRA) which realizes faster data transmission and has upper compatibility with EUTRA. EUTRA is a communication system assuming a network with base station apparatuses with a substantially similar cell configuration (cell size). In A-EUTRA, a communication system is under study assuming a network in which base station apparatuses (cells) of different configurations coexist in a same area (heterogeneous wireless network, heterogeneous network).

Furthermore, a next generation communication standard of LTE is under study in 3GPP (Non Patent Literature 1).

CITATION LIST

Non Patent Literature

Non Patent Literature 1: "3GPP TR 38.913 v. 14.0.0 (2016-10)", 4 Oct. 2016.

SUMMARY OF INVENTION

Technical Problem

In a communication apparatus (terminal apparatus and/or base station apparatus), conventional transmission control may not achieve efficient communication.

An aspect of the present invention, which has been made in view of the above-described respects, is intended to provide a terminal apparatus and a method that enable transmission control in order to efficiently perform communication.

Solution to Problem (1) In order to accomplish the object described above, an aspect of the present invention is contrived to provide the following measures. Specifically, a terminal apparatus according to an aspect of the present invention includes: a receiver configured to receive an SS block including a PSS, an SSS and a PBCH, and/or a CSI-RS; a measurement unit configured to measure an RSRP from the SS block and the CSI-RS; and a transmitter configured to transmit a PRACH and/or a PUSCH, wherein, in an initial access, the transmitter calculates, from the RSRP of the SS block at initial access, a downlink path loss used for transmission power of the PRACH and determines a reference used for the downlink path loss used for transmission power of a first PUSCH scheduled by a random access response grant, based on system information included in the random access response grant, and the system information further includes a first parameter for indicating a subcarrier spacing for the first PUSCH and a second parameter for indicating a signal waveform for the first PUSCH.

(2) Moreover, a method according to an aspect of the invention is a method including: receiving an SS block including a PSS, an SSS and a PBCH, and/or a CSI-RS; measuring an RSRP from the SS block and the CSI-RS; transmitting a PRACH and/or a PUSCH; and in an initial access, calculating, from the RSRP of the SS block at initial access, a downlink path loss used for transmission power of the PRACH; and determining a reference used for a downlink path loss used for transmission power of a first PUSCH scheduled by a random access response grant, based on system information included in the random access response grant, wherein the system information further includes a first parameter for indicating a subcarrier spacing for the first PUSCH and a second parameter for indicating a signal waveform for the first PUSCH.

Advantageous Effects of Invention

According to an aspect of the present invention, transmission efficiency can be improved in a wireless communication system in which a base station apparatus and a terminal apparatus communicate with each other.

DESCRIPTION OF EMBODIMENTS

First Embodiment

Figure 1:
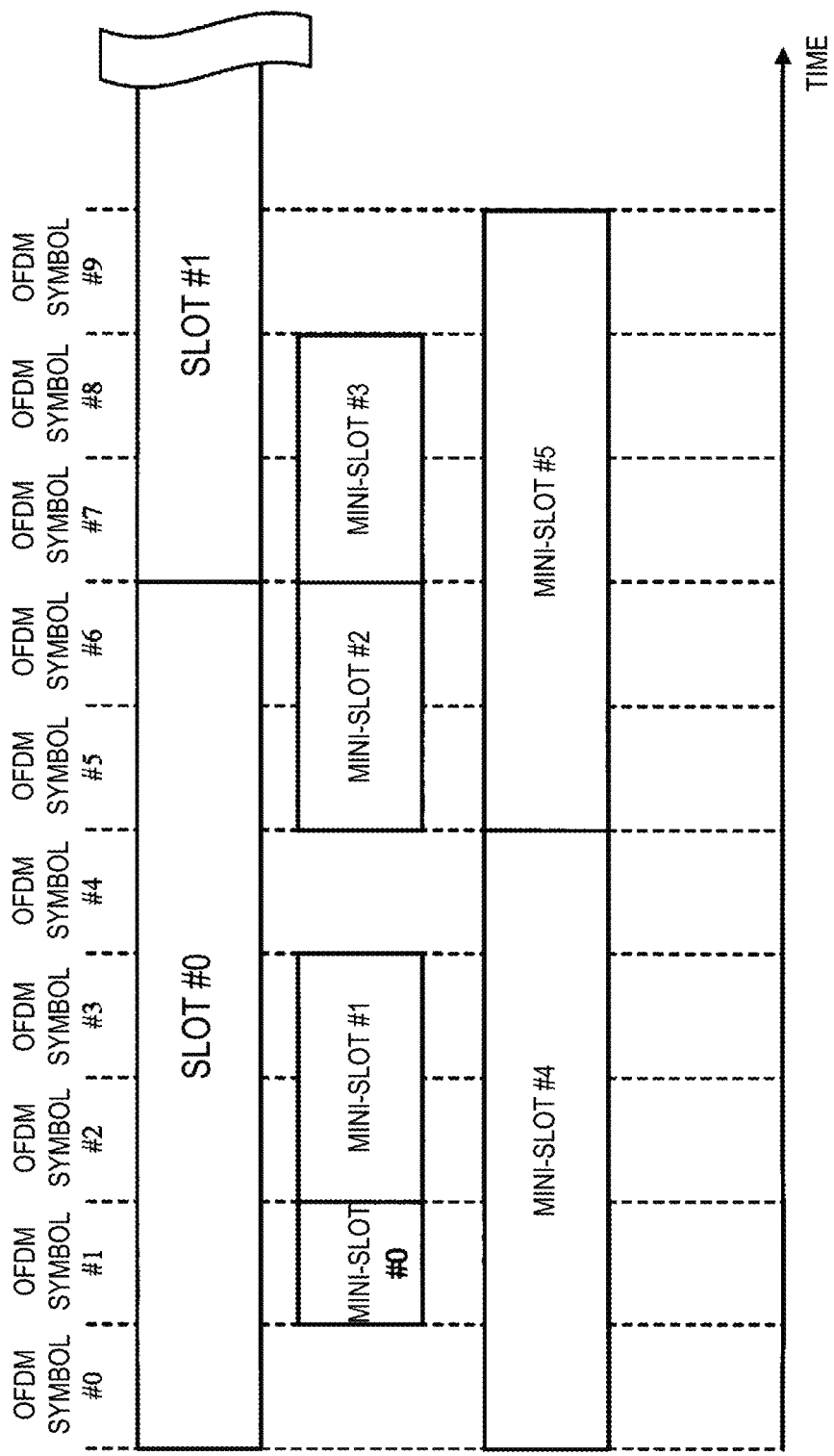
FIG. 1 is a diagram illustrating an example of a configuration of slots and mini-slots according to a first embodiment.

A first embodiment of the present invention will be described below. Description will be provided referring to a communication system in which a base station apparatus 2 and a terminal apparatus 1 communicate with each other within a cell and/or using a carrier. The base station apparatus 2 may also be referred to as a base station, a base station apparatus, node B, an eNB such as EUTRAN NodeB and evolved NodeB, or a gNB. The terminal apparatus 1 may also be referred to as a terminal, a terminal apparatus, a mobile station, a user device, or a User equipment (UE).

A cell supporting Next Generation Radio Access Technology (NR) is also referred to as an NR cell. The carrier of the NR cell is referred to as an NR carrier. The component carrier of the NR cell is also referred to as an NR component carrier.

In the NR cell, NR carrier, and/or NR component carrier, the length (time length, time period) of a subframe, slot, mini-slot, and symbol may be each specified (defined, configured) based on a time unit $T_s$. Here, a symbol may be a Single Carrier-Frequency Division Multiple Access (SC-FDMA) symbol, or an Orthogonal Frequency Division Multiplexing (OFDM) symbol. A mini-slot may also be referred to as a sub-slot. OFDM may also be referred to as Cyclic Prefix-OFDM (CP-OFDM). SC-FDMA may be Discrete Fourier Transform-Spread-OFDM (DFT-S-OFDM). SC-FDMA is a single carrier and effective for communication in a cell, such as a macro cell, that has a wide coverage, whereas OFDM is a multicarrier and effective for communication in a narrow coverage such as a small cell.

The time unit $T_s$ may correspond to a sampling period (sampling interval, sampling rate) of symbols associated with a certain subcarrier spacing. In other words, $T_s$ may be a period for sampling time-continuous signals in a certain time period. Here, sampling the time-continuous signals in the certain time period allows time-discrete signals to be obtained. The time-discrete signal may also be referred to as a sample or a sampling signal. The time-continuous signal may also be referred to as an analog signal. The time-discrete signal may also be referred to as a digital signal. $T_s$ may be a predetermined value, regardless of the subcarrier spacing or sampling size.

The $T_s$ may be determined based on the sampling size for time-continuous signals in the certain time period. In other words, the $T_s$ may be interpreted as the time interval between adjacent time-discrete signals. Here, the sampling size may also be referred to as the number of times sampling is performed, the number of sampling points, the sample size, or the number of samples. The sampling size may be determined based on Fast Fourier Transform (FFT) size and/or Inverse FFT (IFFT) size. The sampling size may be expressed as the power of 2. An available channel bandwidth may be determined based on the sampling size. Here, in a case that the certain time period corresponds to the subcarrier spacing, the certain time period may be expressed as the reciprocal of the subcarrier spacing. In a case that one or more time-discrete signals are generated in the certain time period, a sequence may be generated by using the time-discrete signals. The sequence may also be referred to as time-series signals. The certain time period may also be referred to as the symbol length for the time-continuous signals. The certain time period may also be referred to as the symbol duration for the time-discrete signals. The certain time period may also be referred to as the sequence length for the time-series signals. The time-continuous signals and/or time-discrete signals and/or time-series signals in the certain time period are also referred to as symbols. The symbol may be provided with a Cyclic Prefix (CP), which is equivalent with a guard duration, in order to reduce inter-symbol interference or corresponding inter-subcarrier interference. A duplicate of time-continuous signals and/or time-discrete signals in a part of the certain time period may be used for the CP. The CP may be identical to time-continuous signals and/or time-discrete signals in a part of the certain time period. The time length for the CP may also be referred to as a CP length for the time-continuous signals. The time length for the CP may also be referred to as a CP duration for the time-discrete signals. In the present embodiment, symbol length may be synonymous with symbol duration or sequence length. Moreover, CP length may be synonymous with CP duration.

Letting N be the number of samples in the certain time period, that is, the sampling size in a certain symbol, the symbol length may be expressed as $N \times T_s$. Moreover, letting $N_{CP,1}$ be the sampling size in the CP length, the CP length may be expressed as $N_{CP,1} \times T_s$. Sampling sizes in the CP length may be individually specified and/or configured according to symbol numbers. Hereinafter, a symbol including a CP may be referred to as simply a symbol. In other words, the length of a single symbol may be specified as $(N_{CP,1}+N) \times T_s$. The value of $N_{CP,1}$ may be determined based on the number of a symbol to which a CP is provided. Moreover, the value of $N_{CP,1}$ may also be determined based on the type of CP. For example, the type (classification) of CP includes Normal CP (NCP) and Extended CP (ECP) having a longer CP length than that of NCP.

The channel bandwidth may be associated with the system bandwidth, the maximum transmission bandwidth, the maximum reception bandwidth, the maximum measurement bandwidth, and the total number of available subcarriers. Moreover, the channel bandwidth may also be specified for each operating band. In other words, the supported channel bandwidth may vary according to the operating band. For example, in a case that there are five types of channel bandwidths, the first operating band may support the first to the third channel bandwidths, and need not support the fourth and the fifth channel bandwidths. Moreover, the second operating band may support the first to the fifth channel bandwidths. Here, the operating band may specify a range of carrier frequencies available to downlink carriers and uplink carriers, respectively. Available channel bandwidths or system bandwidths may be specified based on the range of available carrier frequencies. The terminal apparatus and the base station apparatus support at least one operating band. Whether multiple operating bands are supported may be based on the capability of the terminal apparatus and/or the capability of the base station apparatus. Moreover, the operating band may be associated with an available duplexing mode. The larger the sampling size in the certain time period, the wider the supported channel bandwidth may become. For example, a channel bandwidth up to 20 MHz may be supported in a case that the sampling size is 2048 for a 15-kHz subcarrier spacing corresponding to the certain time period, and a channel bandwidth up to 40 MHz may be supported in a case that the sampling size is 4096 for a 15-kHz subcarrier spacing corresponding to the certain time period.

Next, a subframe according to the present embodiment will be described. The length (time length, time period) of the subframe according to the present embodiment may be 1 ms. Moreover, the subcarrier spacing corresponding to the subframe length may be 15 kHz. In other words, the number of symbols constituting a single subframe may be specified based on the 15-kHz subcarrier spacing. For example, the number of symbols constituting a single subframe may be specified taking into account the CP length and the symbol length. For example, the number of symbols constituting a single subframe may be 14 in a case of the NCP. In order to support a 1-ms subframe length, the symbol length of a particular symbol including a CP may differ from that of another symbol including a CP. The length of the CP provided in a particular symbol may be different. A subframe may include one or more slots and/or one or more mini-slots and/or one or more symbols.

The number of symbols included in a single subframe may be specified based on the subcarrier spacing for a physical channel used for transmission and/or reception. For example, in a case that the subcarrier spacing is 15 kHz, the number of symbols included in a single subframe may be 14. Furthermore, in a case that the subcarrier spacing is 30 kHz, the number of symbols included in a single subframe may be 28. Moreover, the number of symbols included in a single subframe may be assumed in the terminal apparatus by detecting a particular physical channel and/or a particular physical signal, or by identifying a subcarrier spacing for a particular physical channel and/or a particular physical signal. In other words, the terminal apparatus may assume the number of symbols included in a single subframe by performing subcarrier synchronization and symbol synchronization. Moreover, the number of symbols included in a single subframe may be specified as a default value for the terminal apparatus. For example, the number of symbols included in a single subframe may be specified in association with the operating band. In other words, in order to camp on a cell and/or capture (detect) a cell which belongs to a carrier frequency of a certain operating band, the terminal apparatus may assume the number of symbols included in a single subframe based on the certain operating band. In other words, the terminal apparatus may, based on the assumption, receive and/or detect a particular physical channel and/or a particular physical signal to be broadcast. Moreover, the terminal apparatus may perform time-frequency synchronization, based on the assumption. Moreover, the terminal apparatus may perform an initial connection establishment procedure and/or a connection re-establishment procedure and/or a handover procedure, based on various configurations and/or parameters indicated by the particular physical channel and/or the particular physical signal. The initial connection establishment procedure may include an initial access procedure. The initial access procedure, the connection re-establishment procedure, and the handover procedure may include a random access procedure.

Here, common higher-layer signaling may refer to signaling including a higher-layer parameter which is configured as a common value and/or a same value among terminal apparatuses in a same cell. Individual higher-layer signaling may refer to signaling including higher-layer parameters which are individually configured for terminal apparatuses in a same cell.

Here, the common physical layer signaling may refer to signaling including a physical layer parameter which is configured as a common value and/or a same value among terminal apparatuses in a same cell. Individual physical layer signaling may refer to signaling including physical layer parameters which may be individually configured for terminal apparatuses in a same cell. The physical resources to which common physical layer signaling is mapped may be identical among terminal apparatuses in a same cell. The physical resources to which individual physical layer signaling is mapped may be different between terminal apparatuses in a same cell.

In a case that information for indicating a configuration relating to a slot and a mini-slot has not been broadcast in the cell, the terminal apparatus may transmit and receive a particular physical channel and/or a particular physical signal, based on various configurations relating to the subframe, until various parameters relating to the slot and the mini-slot are configured. In a case that a default value relating to a slot and a mini-slot described below has not been configured in the terminal apparatus, the terminal apparatus may transmit and receive a particular physical channel and/or a particular physical signal, based on various configurations relating to the subframe, until various parameters relating to the slot and the mini-slot are configured. In a case that a default value relating to a slot and a mini-slot described below has not been configured in the terminal apparatus, and information for indicating a configuration relating to a slot and a mini-slot has not been broadcast in the cell, the terminal apparatus may transmit and receive a particular physical channel and/or a particular physical signal based on various configurations relating to the subframe until various parameters relating to the slot and the mini-slot are configured.

The terminal apparatus may transmit and/or receive various physical channels and/or physical signals, based on parameters relating to the subframe until a parameter relating to the slot and/or the mini-slot is configured. Here, the parameters relating to the subframes may include subcarrier spacing, number of symbols constituting a single subframe, length of a single symbol and/or length of a single CP.

In a case that information for indicating a configuration relating to a slot and a mini-slot has been broadcast in a cell, the terminal apparatus may transmit and receive a particular physical channel and/or a particular physical signal, based on the information for indicating the configuration relating to the slot and the mini-slot.

In a case that a default value relating to a slot and a mini-slot described below has been configured in a terminal apparatus, a particular physical channel and/or a particular physical signal may be transmitted and received, based on the default value. On this occasion, the terminal apparatus may perform transmission and reception through some physical channels and/or physical signals other than a particular physical channel and/or a particular physical signal, based on various configurations relating to the subframe.

In a case that a default value relating to a slot and a mini-slot described below has been configured in a terminal apparatus, and information for indicating a configuration relating to the slot and the mini-slot has been broadcast in a cell, the terminal apparatus may transmit and receive a particular physical channel and/or a particular physical signal, based on the broadcast information for indicating the configuration relating to the slot and the mini-slot. The terminal apparatus may perform transmission and reception through some physical channels and/or physical signals other than a particular physical channel and/or a particular physical signal, based on the default value. Moreover, the terminal apparatus may perform transmission and reception through some physical channels and/or physical signals other than a particular physical channel and/or a particular physical signal, based on various configurations relating to the subframe.

Multiple physical channels and/or multiple physical signals may be mapped in a single subframe. For example, a downlink physical channel and an uplink physical channel may be mapped in a single subframe. Moreover, only physical channels and physical signals relating to downlink may be mapped in a single subframe. Moreover, only physical channels and physical signals relating to uplink may be mapped in a single subframe. The downlink physical channels and uplink physical channels may be specified and/or configured with different numbers of symbols. In a case that downlink physical channels and uplink physical channels can be mapped in a same subframe, it is preferable that the downlink physical channels and the uplink physical channels are mapped to different symbols (different symbol numbers). In a case that reception of downlink physical channel is switched to transmission of uplink physical channel in a terminal apparatus, a gap may be specified and/or configured as a switching point or a switching period. The length of each symbol in the subframe to be specified may correspond to a symbol number. For example, the symbol length may vary depending on the symbol number.

A subframe may be used as a unit of transmission and/or a unit of reception of a particular physical channel and/or a particular physical signal. For example, a subframe may be used to indicate a transmission period or a reception period of a particular physical channel and/or a particular physical signal. Moreover, a subframe may also be used to indicate a time interval for a particular process or a particular procedure. Here, the particular physical channel may refer to a physical channel including a particular piece of information. The particular physical signal may refer to a physical signal transmitted for a particular purpose. For example, the particular physical signal may refer to a signal transmitted for performing time-frequency synchronization. Moreover, the particular physical signal may refer to a signal transmitted for allocating or managing physical resources. Moreover, the particular physical signal may refer to a signal transmitted for measuring a channel state. Here, the channel state may be relating to the quality or power of the channel, the arrival angle, or the number of beams or layers.

Next, a slot according to the present embodiment will be described. The slot may include one or more mini-slots and/or one or more physical channels and/or one or more symbols. The length (length of time) of a single slot may be specified based on the number of symbols constituting a single slot, the length of a single symbol, or the length of a CP provided to the single symbol. The length of the single symbol and the length of the single CP may be specified in relation to the subcarrier spacing applied to the slot. In other words, the length of the symbol and the CP used in the slot may be configured or specified independently of the subframe.

Here, the number of symbols constituting a single slot may be specified based on the subcarrier spacing used in the configuration of the slot. For example, the number of symbols constituting a single slot may be 7 or 14 in a case of a subcarrier spacing of up to 60 kHz. Moreover, the number of symbols constituting a single slot may be 14 in a case that the subcarrier spacing exceeds 60 kHz. Moreover, the number of symbols constituting a single slot may be configured independently of the number of symbols constituting a single subframe. For example, the number of symbols constituting a single slot may be configured via common and/or individual higher-layer signaling. Moreover, the number of symbols constituting a single slot may be configured via the common and/or individual physical layer signaling.

In a case that more than one slot is included in a single subframe for a terminal apparatus, the number of symbols constituting each slot in the subframe may be a common or same number. Moreover, in a case that more than one slot is included in a single subframe for a terminal apparatus, the number of symbols constituting each slot in the subframe may be individually configured. Moreover, in a case that more than one slot is included in a single subframe for a terminal apparatus, the number of symbols constituting each slot in the subframe may be specified based on the subcarrier spacing corresponding to each slot. In a case that slot aggregation which causes multiple slots to be time-multiplexed, and transmitted and/or received is applied to a certain terminal apparatus, the number of symbols constituting each slot in the slot aggregation may be a common or same number. Multiple physical channels and/or multiple physical signals may be mapped in the multiple slots that are time-multiplexed. A single channel may be mapped in the multiple slots that are time-multiplexed.

Multiple physical channels and/or multiple physical signals may be mapped in a single slot. In other words, a slot may specify one or more physical channels, and/or a time-frequency domain in which one or more physical signals are mapped, and/or physical resources. For example, a downlink physical channel and an uplink physical channel may be mapped in a single slot. The downlink physical channel and the uplink physical channel mapped in a single slot may be specified and/or configured with different numbers of symbols. In a case that the downlink physical channel and the uplink physical channel can be mapped in a same slot of a same carrier frequency, the downlink physical channel and the uplink physical channel may be mapped to different symbols (different symbol numbers). In other words, the downlink physical channel and the uplink physical channel mapped in a single slot are mapped by Time Domain Multiplexing (TDM). In a case that reception of the downlink physical channel is switched to transmission of the uplink physical channel in the terminal apparatus, a gap may be specified and/or configured as a switching point or a switching period. In a case that the downlink physical channel and the uplink physical channel can be mapped in a single slot, the length of the symbol used respectively for the downlink physical channel and the uplink physical channel and the length of the CP provided thereto may be common. However, in a case that the length of CP corresponds to the symbol number, the length of CP may vary between the downlink physical channel and the uplink physical channel. Here, a CP may be added according to the number of the symbol to which the CP is provided. In other words, there may be a CP of a same length between symbol numbers, and a CP of a particular length to be added for a particular symbol number. The CP of the particular length to be added may be referred to as an extra CP. The length of the extra CP may be specified based on the subcarrier spacing corresponding to the symbol to be provided. The extra CP may be added to a mini-slot described below in a similar manner. For example, the extra CP may be inserted at an interval of 0.5 ms. In other words, the extra CP may be inserted into corresponding symbols every 0.5 ms. In other words, the extra CP may be inserted into a corresponding symbol or symbol number at a predetermined time interval. For a corresponding symbol number, the extra CP and the NCP may be considered to be a single CP. In other words, the length of the CP provided to a corresponding symbol number may be different from the length of the CP provided to another symbol number.

It is preferable that a slot and a physical channel and/or physical signal mapped in the slot are not mapped on the subframe boundary (between adjacent subframes).

Next, a mini-slot according to the present embodiment will be described. The mini-slot may include one or more symbols. The length (length of time) of a single mini-slot may be specified based on the number of symbols constituting a single mini-slot, the length of a single symbol, and the length of a single CP to be provided to the single symbol. The length of the single symbol and the length of the single CP may be specified in relation to the subcarrier spacing applied to the mini-slot. In other words, the length of the symbol and the CP used for the mini-slot may be configured or specified independently of the subframe or the slot.

Here, the number of symbols constituting a single mini-slot may be smaller than the number of symbols constituting the slot. Moreover, the number of symbols constituting a single mini-slot may be specified or configured based on the number of symbols constituting a single slot. The number of symbols constituting a single mini-slot may be configured independently of the number of symbols constituting a single slot. For example, the number of symbols constituting a single mini-slot may be configured via common and/or individual higher-layer signaling. The number of symbols constituting a single mini-slot may be configured via common and/or individual physical layer signaling. In a case that more than one single mini-slot can be included in the subframe, the number of symbols constituting a single mini-slot between mini-slots included in a single subframe is preferably a common or same number at least in the single subframe. The number of symbols constituting a single mini-slot may be specified in relation to the subcarrier spacing applied or configured for the mini-slot.

A single physical channel and/or a single physical signal may be mapped in a single mini-slot. For example, in a mini-slot, a single physical channel and a physical signal for demodulating the physical channel may be mapped. In other words, the mini-slot may specify a time-frequency domain or a physical resource in which a single physical channel and/or a single physical signal is mapped. Moreover, in a case that the terminal apparatus supports the capability of simultaneously transmitting and/or receiving multiple mini-slots, physical channels and/or physical signals may individually be mapped for each mini-slot. The mini-slot may be configured only in a case that the slot is configured. The mini-slot and the slot may be coexisting in a single subframe. In a case that the slot and the mini-slot are individually configured, the terminal apparatus and/or the base station apparatus may simultaneously transmit and/or receive the slot and the mini-slot, or the physical channel and the physical signal allocated to each of the slot and the mini-slot. Whether to allow simultaneous transmission and reception of different mini-slots to be performed in a single subframe of a single cell may be determined based on the capability supported by the terminal apparatus. Here, "individually configured" may include the meaning that related parameters are individually configured.

Moreover, multiple mini-slots may be included in a single slot. Mini-slots for downlink and mini-slots for uplink may be included in a single slot. In a case that reception of the mini-slots for downlink is switched to transmission of the mini-slots for uplink in the terminal apparatus, it is preferable that a gap corresponding to the switching point is included between the downlink mini-slot and the uplink mini-slot.

Configuration of a mini-slot (for example, the number of symbols constituting the mini-slot or the subcarrier spacing) may be specified based on various parameters configured for the physical channel and/or the physical signal included in the mini-slot. In a case that multiple mini-slots are included in a single subframe and/or a single slot, it is preferable that configurations of the mini-slots for a particular physical channel and/or a particular physical signal are identical in a single subframe and/or a single slot. For example, although it is preferable that configurations of physical channels including control information are identical in a single subframe and/or a single slot, configurations of physical channels including data information may be different in a single subframe and/or a single slot.

Moreover, whether to perform transmission and/or reception by using a mini-slot may be determined based on the capabilities supported by the terminal apparatus and the base station apparatus. In other words, the transmission and/or the reception using the mini-slot need not be performed until parameters associated with the mini-slot are configured via a common and/or individual higher-layer signaling and/or physical layer signaling.

It is preferable that the mini-slot and the physical channel and/or the physical signal mapped in the mini-slot are not mapped on the subframe boundary (i.e., in a manner crossing adjacent subframes). Moreover, it is also preferable that the mini-slot and the physical channel and/or the physical signal mapped in the mini-slot are not mapped on the slot boundary (between adjacent slots).

FIG. 1 illustrates an example of a configuration of slots and mini-slots according to a first embodiment. In FIG. 1, the number of OFDM symbols constituting a slot is seven. A mini-slot may include a smaller number of OFDM symbols than the number of OFDM symbols constituting a slot. The length of the mini-slot may be shorter than that of the slot. FIG. 1 illustrates mini-slots #0 to #5 as an example of mini-slot configuration. The mini-slot may include a single OFDM symbol, as indicated by the mini-slot #0. The mini-slot may include two OFDM symbols as indicated by the mini-slots #1 to #3. Moreover, a gap may be inserted between two mini-slots, as indicated by the mini-slots #1 and #2. Moreover, the mini-slot may be configured so as to cross the boundary between the slots #0 and #1, as indicated by the mini-slot #5. In other words, the mini-slot may be configured so as to cross the boundary between the slots. Here, the mini-slot is also referred to as a sub-slot. Moreover, the mini-slot is also referred to as a short Transmission Time Interval (short TTI (sTTI)). Moreover, in the following, the slot may be replaced by the mini-slot. The mini-slot may include the same number of OFDM symbols as that of the slot. A mini-slot may include a larger number of OFDMs than the number of OFDM symbols constituting the slot. The length of the time domain of the mini-slot may be shorter than that of the slot. The length of the time domain of the mini-slot may be shorter than a single subframe (for example, 1 ms).

One or more subcarrier spacings may be specified or used for a single operating band. For example, transmission and reception using the physical channel and/or the physical signal with a subcarrier spacing of 15 kHz, 30 kHz, or 60 kHz may be supported for operating band index 1. Moreover, transmission and reception using the physical channel and/or the physical signal with a subcarrier spacing of 15 kHz may be supported for operating band index 2.

In a case that Radio Frequency (RF) bandwidth is different between successive subframes/slots/mini-slots, and a second RF bandwidth in a subsequent subframe/slot/mini-slot is wider than a first RF bandwidth in a preceding subframe/slot/mini-slot, the terminal apparatus need not expect to receive a physical channel and/or a physical signal in the subframe/slot/mini-slot with the second RF bandwidth in the absence of a gap which is longer than a predetermined time period between successive subframes/slots/mini-slots.

A ratio of the length of a symbol and the length of a CP provided for a single symbol corresponds to a subcarrier spacing. In a case that the ratios are identical, alignment at a symbol level may be performed that corresponds to different subcarrier spacings. Here, the alignment at the symbol level may be intended such that a symbol corresponding to a different subcarrier spacing is not mapped in an overlapping manner with respect to the boundary of symbols with a reference subcarrier spacing. In other words, it may be intended that the symbol length or the CP length are adjusted such that a symbol for a different subcarrier spacing is mapped without overlapping the boundary of symbols with a certain subcarrier spacing. For example, it is preferable that a symbol corresponding to a second subcarrier spacing is not mapped on the boundary of symbols corresponding to a first subcarrier spacing.

Next, a physical channel and a physical signal according to the present embodiment will be described. The physical channel and the physical signal relating to downlink may be respectively referred to as a downlink physical channel and a downlink physical signal. Moreover, the physical channel and the physical signal relating to uplink may be respectively referred to as an uplink physical channel and an uplink physical signal.

The physical channel for downlink may be used to transmit, for example, broadcast information, system information, paging information, various configuration information, Acknowledgement (ACK)/Negative Acknowledgement (NACK), user data, or control data. A resource allocation method or a sequence generation method used for the physical channel may be defined, according to each application. The downlink user data may include downlink shared data. The control data may include downlink control information (DCI). The control data may include a grant used for downlink and/or uplink scheduling. For example, the broadcast information may be transmitted via a physical broadcast channel. The paging information may be transmitted via a physical paging channel. The user data may be transmitted via a physical shared channel. The control data may be transmitted via a physical control channel. Moreover, the broadcast information, the system information, and the paging information may be transmitted via a physical shared channel.

To be more specific, in downlink wireless communication from the base station apparatus 2 to the terminal apparatus 1, the following downlink physical channels may be used. The downlink physical channels may be used by the physical layer in order to transmit information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, BCH, Broadcast Channel), which are commonly used by the terminal apparatuses 1. The PBCH may be transmitted based on a predetermined transmission interval. For example, the PBCH may be transmitted at an interval of 80 ms. The content of information included in the PBCH may be updated every 80 ms. The PBCH may include 288 subcarriers. The PBCH may include 2, 3, or 4 OFDM symbols. The MIB may include information relating to an identifier (index) of a synchronization signal. The MIB may include information for indicating at least a part of: the number of the slot in which PBCH is transmitted, the number of the subframe in which PBCH is transmitted, and the number of the radio frame in which PBCH is transmitted.

The PDCCH is used for transmitting downlink control information (DCI). The downlink control information may be referred to as DCI format. The DCI format may be specified based on the type or the number of bits of the DCI constituting a single DCI format. The downlink control information may include at least one of downlink grant or uplink grant. The downlink grant may be referred to as downlink assignment or downlink allocation.

A single downlink grant is used for at least scheduling of a PDSCH within a serving cell. The downlink grant may be used for at least scheduling of the PDSCH within the same slot as the slot in which the downlink grant has been transmitted.

An uplink grant may be used for at least scheduling of a PUSCH within a serving cell.

In the terminal apparatus 1, one or more control resource sets (CORESETs) may be configured in order to search for the PDCCH. The terminal apparatus 1 may attempt to receive the PDCCH in the control resource set configured.

The unit of mapping the control resource set may be a resource block in the frequency domain (frequency resource). Moreover, the unit of mapping the control resource set may be an OFDM symbol in the time domain (time resource).

The frequency domain of the control resource set may be identical to the system bandwidth of the serving cell. The frequency domain of the control resource set may be provided based on at least the system bandwidth of the serving cell. The frequency domain of the control resource set may be provided based on at least higher-layer signaling and/or downlink control information.

The time domain of the control resource set may be provided based on at least higher-layer signaling and/or downlink control information.

The control resource set may include at least one or both of a common control resource set and a dedicated control resource set. The common control resource set may be a control resource set configured commonly to the multiple terminal apparatuses 1. The common control resource set may be provided based on at least MIB, first system information, second system information, common RRC signaling, cell ID, or the like. The dedicated control resource set may be a control resource set configured to be dedicatedly used for the terminal apparatus 1. The dedicated control resource set may be provided based on at least dedicated RRC signaling and/or a value of C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or more search spaces (SSs). The control resource set may be a single search space.

The search space may include one or more PDCCH candidates. The terminal apparatus 1 receives a PDCCH candidate included in the search space and attempts to receive the PDCCH. Here, the PDCCH candidate may be referred to as a blind detection candidate.

The search area may include at least one or both of Common Search Space (CSS) and UE-specific Search Space (USS). The CSS may be a search space configured commonly to multiple terminal apparatuses 1. The USS may be a search space including a configuration to be dedicatedly used for the terminal apparatus 1. The CSS may be provided based on at least the MIB, the first system information, the second system information, the common RRC signaling, the cell ID, or the like. The USS may be provided based on at least the dedicated RRC signaling and/or the value of C-RNTI.

The common control resource set may include at least one or both of the CSS and the USS. The dedicated control resource set may include at least one or both of the CSS and the USS. The dedicated control resource set need not include the CSS.

A physical resource of the search space includes a Control Channel Element (CCE) of the control channel. The CCE may include a predetermined number of Resource Element Groups (REGs). For example, the CCE may include six REGs. An REG may include a single OFDM symbol of a single Physical Resource Block (PRB). In other words, the REG may include 12 Resource Elements (REs). The PRB may be referred to as simply a Resource Block (RB).

The PDSCH is used to transmit downlink data (DL-SCH, PDSCH). The downlink data may include parameters used for various measurements and transmission power configuration. Moreover, the PDSCH may be used to transmit a random access message 2 (random access response). Moreover, the PDSCH may be used to transmit system information including parameters used for initial access. Moreover, the PDSCH may be used to transmit paging information.

The physical signal for downlink may be used to perform, for example, demodulation of an uplink physical channel, time-frequency synchronization (symbol alignment, subcarrier spacing synchronization, slot synchronization, subframe synchronization), timing synchronization (timing adjustment), capture/detection of cell ID, Radio Resource Management (RRM) measurement, Channel State Information (CSI) measurement, beam management and/or beam capture, or positioning. A resource allocation method or a sequence generation method used for the physical signal may be defined, according to each application.

For downlink wireless communication, the following downlink physical signals may be used. Although the downlink physical signal need not be used for transmission of information output from a higher layer, the downlink physical signal may be used in the physical layer.

Synchronization signal (SS)
Downlink Reference Signal (DL RS)

The synchronization signal is used for the terminal apparatus 1 to establish synchronization in a frequency domain and a time domain in the downlink. The synchronization signal includes a Primary Synchronization Signal (PSS) and a Second Synchronization Signal (SSS). Moreover, a Phase Tracking Synchronization Signal (PTSS) for measuring phase rotation may be included.

A single set including at least PSS, SSS, PBCH may also be referred to as an SS block. Moreover, the SS block may include system information. Moreover, the PDCCH for scheduling of the PDSCH including system information may be indicated, based on the PBCH included in the SS block. Moreover, indices used for identification may be different between different SS blocks.

The downlink reference signal is used for the terminal apparatus 1 to perform channel compensation on a downlink physical channel. The downlink reference signal is used for the terminal apparatus 1 to obtain the downlink channel state information.

In the present embodiment, the following downlink reference signals may be used.

Demodulation Reference Signal (DMRS)
Shared Reference Signal (Shared RS)
Channel State Information Reference Signal (CSI-RS)

The DMRS is associated with transmission of the PDCCH and/or the PDSCH. The DMRS is multiplexed with the PDCCH or the PDSCH. In order to perform channel compensation of the PDCCH or the PDSCH, the terminal apparatus 1 may use the DMRS corresponding to the PDCCH or the PDSCH. Hereinafter, transmission of both a PDCCH and a DMRS corresponding to the PDCCH may be referred to as simply transmission of the PDCCH. Hereinafter, transmission of both a PDSCH and a DMRS corresponding to the PDSCH may be referred to as simply transmission of the PDSCH.

The DMRS may be an RS which is individually configured for the terminal apparatus 1. The sequence of DMRS may be provided based on at least parameters individually configured for the terminal apparatus 1. The DMRS may be individually transmitted for the PDCCH and/or the PDSCH. On the other hand, the Shared RS may be an RS which is commonly configured for multiple terminal apparatuses 1. The sequence of Shared RS may be provided regardless of parameters individually configured for the terminal apparatus 1. For example, the sequence of Shared RS may be provided based on at least some of the slot number, the mini-slot number, and the cell ID. The Shared RS may be an RS which is transmitted regardless of whether the PDCCH and/or the PDSCH has been transmitted.

The Shared RS may be associated with transmission of at least PDCCH. The Shared RS may be multiplexed with the PDCCH. The terminal apparatus 1 may use the Shared RS to perform channel compensation of the PDCCH. Hereinafter, transmission of both the PDCCH and the Shared RS may be referred to as simply transmission of the PDCCH.

A CSI-RS may be used for RRM measurement of Reference Signal Received Power (RSRP), Reference Signal Received Quality (RSRQ), and the like, or CSI measurement. CSI-RS configuration for the RRM measurement and CSI-RS configuration for the CSI measurement may be individually configured. The RSRP is received power obtained by the terminal apparatus 1 by measuring a particular signal under a particular condition. The RSRQ is reception quality obtained by the terminal apparatus 1 by measuring a particular signal under a particular condition.

CSI-RSs may include a CSI-RS periodically transmitted with a higher-layer parameter configured, and a CSI-RS whose transmission is indicated by a CSI request included in the DCI format.

The BCH, the UL-SCH, and the DL-SCH are transport channels. The channel used in the Medium Access Control (MAC) layer is referred to as a transport channel. The unit of transport channels used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 2 and the terminal apparatus 1 exchange (transmit and receive) signals in a higher layer. For example, in the radio resource control (RRC) layer, the base station apparatus 2 and the terminal apparatus 1 may transmit and/or receive RRC signaling (also referred to as an RRC message, RRC information). Moreover, the base station apparatus 2 and the terminal apparatus 1 may transmit and/or receive a MAC Control Element (CE) in the MAC layer. Here, the RRC signaling and/or the MAC CE is also referred to as a higher-layer signal or higher-layer signaling.

The PUSCH and the PDSCH are used at least to transmit the RRC signaling and the MAC CE. Here, the RRC signaling transmitted from the base station apparatus 2 via the PDSCH may be signaling common to multiple terminal apparatuses 1 in a cell. The signaling common to the multiple terminal apparatuses 1 in the cell may also be referred to as common RRC signaling. The RRC signaling transmitted from the base station apparatus 2 via the PDSCH may be signaling dedicated to a certain terminal apparatus 1 (also referred to as dedicated signaling or UE specific signaling). The signaling dedicated to the terminal apparatus 1 may also be referred to as dedicated RRC signaling. A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1. The PDSCH including the dedicated RRC signaling may be scheduled via the PDCCH in the first control resource set.

Broadcast Control CHannel (BCCH), Common Control CHannel (CCCH), and Dedicated Control CHannel (DCCH) are logical channels. For example, the BCCH is a higher-layer channel used to transmit the MIB. Moreover, the Common Control Channel (CCCH) is a higher-layer channel used to transmit information common to the multiple terminal apparatuses 1. Here, the CCCH is used for the terminal apparatus 1 which is not in an RRC-connected state, for example. Moreover, the Dedicated Control Channel (DCCH) is a higher-layer channel used to transmit individual control information (dedicated control information) to the terminal apparatus 1. Here, DCCH is used for the terminal apparatus 1 which is in an RRC-connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

The physical channel for uplink may be used transmit, for example, capability information of the terminal apparatus, Acknowledgement (ACK)/Negative Acknowledgement (NACK), a report of the measurement result of RRM measurement or CSI measurement, user data, control data, and a random access preamble (random access information). A resource allocation method or a sequence generation method used for the physical channel may be defined, according to each application. Uplink user data may include uplink shared data. The user data and/or the control data may include uplink control information (UCI). The UCI may include feedback information relating to Hybrid Auto Repeat reQuest (HARQ) and CSI. The user data may be transmitted on a physical shared channel (PSCH). The control data may be transmitted on a physical control channel (PCCH). The random access preamble may be transmitted on a physical random access channel (PRACH).

To be more specific, in uplink wireless communication from the terminal apparatus 1 to the base station apparatus 2, at least the following uplink physical channels may be used. The uplink physical channel may be used by the physical layer in order to transmit information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes Channel State Information (CSI) of downlink channel, a scheduling request (SR) used to request a PUSCH (UpLink-Shared Channel (UL-SCH)) resource for initial transmission, and a Hybrid Automatic Repeat request ACKnowledgement (HARQ-ACK) for downlink data (Transport block (TB), Medium Access Control Protocol Data Unit (MAC PDU), DownLink-Shared Channel (DL-SCH), and Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The Channel State Information (CSI) includes at least a Channel Quality Indicator (CQI) and a Rank Indicator (RI). The channel quality indicator may include a Precoder Matrix Indicator (PMI). The CQI is an indicator associated with channel quality (propagation strength), and the PMI is an indicator for indicating a precoder. The RI is an indicator for indicating a transmission rank (or the number of transmission layers).

The PUSCH is used to transmit uplink data (TB, MAC PDU, UL-SCH, PUSCH). The PUSCH may be used to transmit HARQ-ACK and/or channel state information together with the uplink data. Furthermore, the PUSCH may be used to transmit only the channel state information or to transmit only the HARQ-ACK and the channel state information. The PUSCH may be used to transmit a random access message 3 in a case of a random access procedure. The random access message 3 may be scheduled by a random access response grant.

The PRACH is used to transmit a random access preamble (random access message 1). The PRACH is used to indicate an initial connection establishment procedure, a handover procedure, a connection re-establishment procedure, synchronization (timing adjustment) for transmission of uplink data, and a request for PUSCH (UL-SCH) resources. The random access preamble may be used to notify the base station apparatus 2 of an index (random access preamble index) provided by a higher layer of the terminal apparatus 1.

The random access preamble may be provided by cyclic-shifting of a Zadoff-Chu sequence corresponding to a physical root sequence index u. The Zadoff-Chu sequence may be generated based on the physical root sequence index u. In a single cell, multiple random access preambles may be defined. The random access preamble may be identified based on at least the index of the random access preamble. Different random access preambles corresponding to different indices of random access preambles may correspond to different combinations of the physical root sequence index u and the cyclic shift. The physical root sequence index u and the cyclic shift may be provided based on at least information included in the system information. The physical root sequence index u may be an index for identifying a sequence included in the random access preamble. The random access preamble may be identified based on at least the physical root sequence index u.

The physical signal for uplink may be used to perform, for example, demodulation of an uplink physical channel, time-frequency synchronization, timing synchronization and timing adjustment, channel state measurement, beam management and/or beam capture, or positioning of the terminal apparatus. A resource allocation method or a sequence generation method used for the physical signal may be defined, according to each application.

To be more specific, in uplink wireless communication, the following uplink physical signals may be used. Although the uplink physical signal need not be used for transmission of information output from a higher layer, the uplink physical signal may be used in the physical layer.

Uplink Reference Signal (UL RS)

According to the present embodiment, at least the following two types of uplink reference signals may be used.

Demodulation Reference Signal (DMRS)
Sounding reference signal (SRS)

The DMRS is associated with transmission of the PUSCH or the PUCCH. The DMRS is multiplexed with the PUSCH or the PUCCH. The base station apparatus 2 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS need not be associated with transmission of the PUSCH or the PUCCH. The base station apparatus 2 may use the SRS to measure the channel state. The SRS may be used by the base station apparatus 2 to measure the transmission beam (transmission precoding) of the terminal apparatus 1. Moreover, the SRS may be used by the base station apparatus 2 to measure the RSRP or path loss for the uplink, or the downlink carrier frequency. Moreover, the SRS may be used by the base station apparatus 2 to measure the timing for uplink. Moreover, the SRS may be transmitted in the last OFDM symbol or a predetermined number of OFDM symbols from the last OFDM symbol inclusive in the subframe or the slot in the uplink slots. Moreover, the transmission of SRS may be indicated based on an SRS request included in the uplink grant or the downlink grant. Moreover, multiple parameter sets of SRS may be configured for a single cell. In other words, one or more SRSs may be triggered in a single cell.

The resource allocation method and the sequence generation method may be different between downlink and uplink. Moreover, each physical channel may also be referred to as a physical channel including a certain piece of information or a certain set of data.

Next, numerology according to the present embodiment will be described.

The numerology according to the present embodiment may include one or all of the following parameters. The parameters described below may each be configured for each terminal apparatus, each cell (serving cell), each cell group, each beam (transmission precoding, reception precoding), each beam group (transmission precoding group, reception precoding group), each physical channel, and each MAC entity. Moreover, the parameters described below may each correspond to an operating band. Moreover, the parameters described below may each have a default value configured thereto. Moreover, the parameters described below may each be configured by using at least one of broadcast information, system information, paging information, higher-layer signal (RRC signaling), or DCI.

(A0) Subcarrier spacing
(A1) Number of symbols constituting a slot/mini-slot
(A2) Time length (TTI length) of a slot/mini-slot
(A3) Length of a symbol
(A4) Length of CP provided to a symbol
(A5) Number of symbols constituting a mini-slot
(A6) FFT size (sampling rate)

The time-frequency domain for monitoring the physical control channel may be referred to as a control resource set. The control resource set may be configured for both the Common Search Space (CSS) and the UE-specific Search Space (USS). In a case that multiple control resource sets can be configured, the numerology may be associated with each of the control resource sets.

Next, the random access procedure according to the present embodiment will be described. Random access is performed for initial access (initial connection), RRC connection re-establishment, handover, downlink data arrival, uplink data arrival, and timing adjustment.

Figure 2:
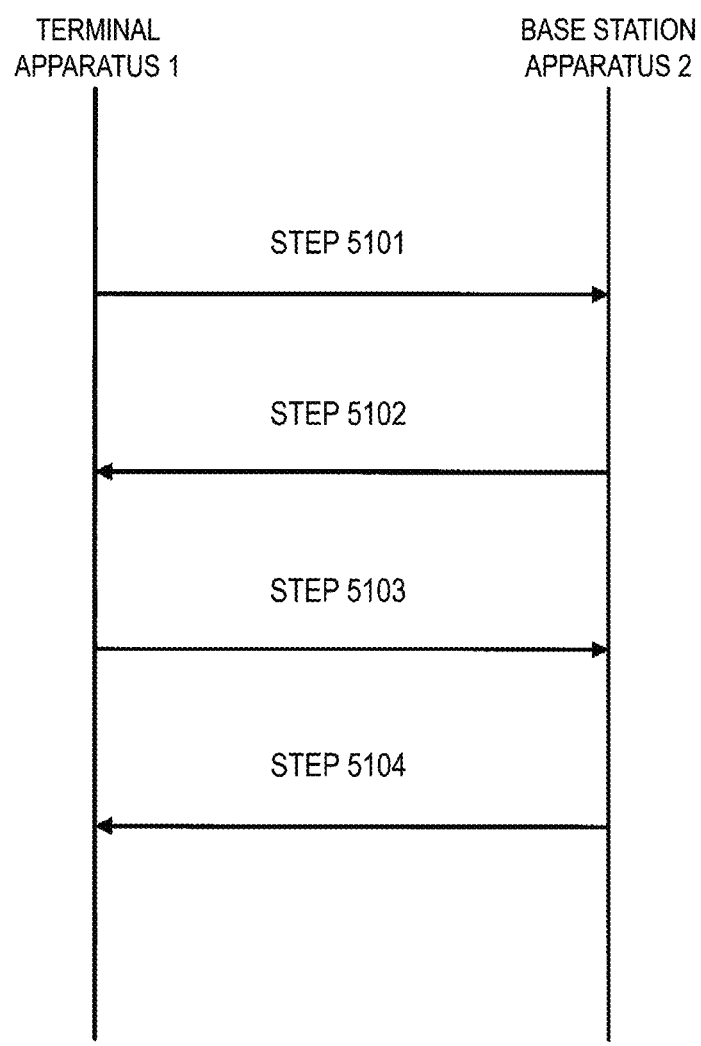
FIG. 2 is a diagram illustrating an example of a four-step random access procedure according to the first embodiment.

FIG. 2 illustrates an example of a 4-step random access procedure. Such a random access procedure may also be referred to as a contention based random access procedure. The random access procedure after the terminal apparatus 1 has established an RRC connection may also be referred to as a non-contention based random access procedure.

Step 5101 is a step in which the terminal apparatus 1 requests, via a physical channel, a target cell to respond for initial connection. Alternatively, step 5101 is a step in which the terminal apparatus 1 performs initial transmission to the target cell via the physical channel. Here, the physical channel may be a PRACH, for example. The physical channel may be a channel dedicatedly used to request a response for initial connection. Moreover, the physical channel may be the PRACH. In step 5101, the message transmitted from the terminal apparatus 1 via the physical channel is also referred to as a random access message 1. The random access message 1 may be a random access preamble configured by higher-layer signaling (higher-layer parameter).

The terminal apparatus 1 performs downlink time-frequency synchronization prior to performing step 5101. In a first state, a synchronization signal is used for the terminal apparatus 1 to establish downlink time-frequency synchronization.

The synchronization signal may be transmitted with an ID (cell ID) of the target cell included therein. The synchronization signal may be transmitted with a sequence generated based on at least the cell ID included therein. The synchronization signal including the cell ID may mean that a sequence of synchronization signals is provided based on the cell ID. The synchronization signal may be transmitted with a beam (or precoder) applied thereto.

The beam exhibits a phenomenon that antenna gain varies according to the direction. The beam may be provided based on at least the directivity of the antenna. Moreover, the beam may be provided based on at least the phase shift of the carrier signal. Moreover, the beam may be provided by application of a precoder.

The terminal apparatus 1 receives the PBCH transmitted from the target cell. The PBCH may be transmitted with the MIB included therein, the MIB including important system information used by the terminal apparatus 1 to connect to the target cell. The MIB is system information. The MIB may include information relating to the radio frame number. The MIB may include information relating to the location in a super frame including multiple radio frames (for example, information for indicating at least some of the system frame numbers (SFN) in the super frame). The PBCH may include an index of the synchronization signal. The PBCH may include information relating to reception (monitoring) of the PDCCH. The MIB may be mapped to the BCH in the transport channel. The MIB may be mapped to the BCCH in the logical channel.

The information relating to reception of the PDCCH may include information for indicating a control resource set. The information for indicating the control resource set may include information relating to the number of PRBs to which the control resource set is mapped. The information for indicating the control resource set may include information for indicating mapping of the control resource set. The information for indicating the control resource set may include information relating to the number of OFDM symbols to which the control resource set is mapped. The information for indicating the control resource set may include information for indicating the period (periodicity) of the slot to which the control resource set is mapped. The terminal apparatus 1 may attempt to receive the PDCCH based on at least the information for indicating the control resource set included in the PBCH.

The Information relating to reception of the PDCCH may include information relating to an ID for indicating the destination of the PDCCH. The ID for indicating the destination of the PDCCH may be an ID used for scrambling the CRC-bits to be added to the PDCCH. The ID for indicating the destination of the PDCCH is also referred to as a Radio Network Temporary Identifier (RNTI). Information relating to the ID used for scrambling the CRC bits added to the PDCCH may be included. The terminal apparatus 1 may attempt to receive the PDCCH based on at least the information relating to the ID included in the PBCH.

The RNTI may include a System Information-RNTI (SI-RNTI), a Paging-RNTI (a P-RNTI), a Common RNTI (C-RNTI), a Temporary C-RNTI, and a Random Access-RNTI (RA-RNTI). The SI-RNTI is used at least for scheduling the PDSCH transmitted with system information included therein. The P-RNTI is used at least for scheduling the PDSCH transmitted with paging information and/or information such as notification of change of the system information included therein. The C-RNTI may be used for scheduling user data for the terminal apparatus 1 in an RRC-connected state. The Temporary C-RNTI may be used for scheduling a random access message 4. The Temporary C-RNTI may be used to schedule the PDSCH including data to be mapped to the CCCH in the logical channel. The RA-RNTI may be used for scheduling the random access message 2.

The information relating to reception of the PDCCH may include information relating to an aggregation level of the search space included in the control resource set. The terminal apparatus 1 may identify the aggregation level of PDCCH candidates whose reception should be attempted and determine the search space, based on at least the information relating to the aggregation level of the search space included in the control resource set included in the PBCH.

The information relating to reception of the PDCCH may include information relating to a method for mapping a REG constituting the CCE. The information relating to the method for mapping the REG constituting the CCE may include information for indicating continuous mapping and non-continuous mapping. The information relating to the method for mapping the REG constituting the CCE may include information for indicating whether the method for mapping the REG constituting the CCE is Time-first mapping or Frequency-first mapping.

The base station apparatus 2 may transmit the PBCH including information relating to reception of the PDCCH, and indicate to the terminal apparatus 1 to monitor a first control resource set. The terminal apparatus 1 monitors the first control resource set based on at least detecting of information relating to reception of the PDCCH included in the PBCH. Here, the first control resource set may be used for scheduling the first system information. Moreover, the first system information may include system information which is important for the terminal apparatus 1 to connect to the target cell. Moreover, the first system information may include information relating to various downlink configurations. Moreover, the first system information may include information relating to various PRACH configurations. Moreover, the first system information may include information relating to various uplink configurations. Moreover, the first system information may include information of a signal waveform (OFDM or DFT-s-OFDM) configured for transmission of the random access message 3. Moreover, the first system information may include information relating to configuration of the SS block. Moreover, the first system information may include information relating to configuration of the CSI-RS used for RRM measurement. In the first system information, one or more SS block configurations and/or CSI-RS configurations may be configured. Moreover, the first system information may include information for indicating the transmission power used in the SS block and/or the CSI-RS. Moreover, the first system information may also include at least a part of the system information other than the information included in the MIB. The first system information may be mapped to the BCH in the transport channel. The first system information may be mapped to the BCCH in the logical channel. The first system information may include at least a System Information Block type 1 (SIB1). The first system information may include at least a System Information Block type 2 (SIB2). The first control resource set may be used for scheduling the random access message 2. The SIB1 may include information relating to a measurement required to perform RRC connection. Moreover, the SIB2 may include information relating to a channel which is common and/or shared among multiple terminal apparatuses 1 in a cell.

Configuration of the PDCCH and/or the control resource set to be monitored by the terminal apparatus 1 may include at least one of the following parameters. The following parameters may be configured for each serving cell.

(B0) Bandwidth or number of resource blocks to be monitored (B1) Frequency position or frequency offset (B2) Transmission type or mapping type (for example, localized mapping or distributed mapping)

(B3) Scrambling ID (B4) Start symbol (B5) Time domain (number of OFDM symbols, time period)

(B6) Configuration ID (PDCCH ID, CORESET ID) for identification, on the assumption of multiple configurations (B7) Frequency hopping pattern, on the assumption of being configured (B8) Number of repetitive transmissions, on the assumption of being configured (B9) Parameter relating to numerology, on the assumption of being configured (B10) Parameter relating to beam (precoding), on the assumption of being configured (B11) Aggregation Level, on the assumption of being configured The configurations for the PDCCH and/or the control resource set may be individually configured according to the purpose. For example, the first configuration relating to the PDCCH and/or the control resource set used for scheduling the physical shared channel including the paging information, and the second configuration relating to the PDCCH and/or the control resource set used for scheduling the physical shared channel including the system information may be individually configured. Moreover, the third configuration relating to the PDCCH and/or the control resource set for scheduling the physical shared channel including the broadcast information may be configured independently of the first configuration and the second configuration. The configurations may be configured via higher-layer signals.

Step 5102 is a step in which the base station apparatus 2 sends, to the terminal apparatus 1, a response to the random access message 1. The response is also referred to as the random access message 2. The random access message 2 may be transmitted via the PDSCH. The PDSCH including the random access message 2 is scheduled by the PDCCH. The CRC bits included in the PDCCH may be scrambled by the RA-RNTI. The random access message 2 may be transmitted with a special uplink grant included therein. The special uplink grant may be referred to as a random access response grant. The special uplink grant may be included in the PDSCH including the random access message 2. The random access response grant may include at least a Temporary C-RNTI. In other words, the random access message 2 may include the random access response grant.

The random access response grant may include a transmission power control command (TPC command) for indicating a correction value for the power control adjustment value used for the transmission power of the random access message 3.

The use of the power adjustment control value obtained by appropriately accumulating the correction value obtained from the received TPC command for transmission power may also be referred to as TPC accumulation. Moreover, the use of a single correction value most recently received, without accumulating the correction value obtained from the TPC command, for transmission power as a power control adjustment value may also be referred to as TPC Absolute.

Step 5103 is a step in which the terminal apparatus 1 transmits, to the target cell, a request for RRC connection. The request for RRC connection is also referred to as a random access message 3. The random access message 3 may be transmitted via the PUSCH scheduled by the random access response grant. The random access message 3 may include an ID used to identify the terminal apparatus 1. The ID may be an ID managed in a higher layer. The ID may be an SAE Temporary Mobile Subscriber Identity (S-TMSI). The ID may be mapped to the CCCH in the logical channel.

Step 5104 is a step in which the base station apparatus 2 transmits a Contention resolution message to the terminal apparatus 1. The Contention resolution message may be referred to as a random access message 4. The terminal apparatus 1, after transmitting the random access message 3, monitors the PDCCH that performs scheduling of the PDSCH including the random access message 4. The random access message 4 may include a contention avoidance ID. Here, the contention avoidance ID is used to resolve a contention in which multiple terminal apparatuses 1 transmit signals by using a same radio resource. The contention avoidance ID may also be referred to as a UE contention resolution identity.

In step 5104, the terminal apparatus 1 which has transmitted the random access message 3 including the ID used for identifying the terminal apparatus 1 (S-TMSI, for example) monitors the random access message 4 including the Contention resolution message. In a case that the contention avoidance ID included in the random access message 4 is identical to the ID used to identify the terminal apparatus 1, the terminal apparatus 1 may consider that the contention resolution has been successfully completed, and set the value of the Temporary C-RNTI in the C-RNTI field. The terminal apparatus 1 having the value of the Temporary C-RNTI set in the C-RNTI field is considered to have completed an RRC connection.

The control resource set for monitoring the PDCCH that performs scheduling of the random access message 4 may be identical to the control resource set for monitoring the PDCCH that performs scheduling of the random access message 2. The base station apparatus 2 may transmit the information relating to reception of the PDCCH with the information relating to reception of the PDCCH included in the random access message 2, and indicate to the terminal apparatus 1 to monitor the second control resource set. The terminal apparatus 1 monitors the PDCCH based on at least the information relating to reception of the PDCCH included in the random access message 2. The second control resource set may be used for scheduling a random access message 5.

The terminal apparatus may notify, as capability information, the support of a capability relating to simultaneous reception of multiple numerologies, in a case that simultaneous monitoring of physical control channels for multiple numerologies is performed in at least a single serving cell.

Next, a reference of a downlink path loss used for uplink transmission power according to the present embodiment will be described.

In a case that the first system information includes information for indicating the signal waveform of the random access message 3, the terminal apparatus 1 may determine the reference of downlink path loss (path loss reference) used for the transmission power of the random access message 3, based on whether the information for indicating the signal waveform is OFDM (CP-OFDM) or DFT-S-OFDM. Here, the path loss reference may refer to a downlink reference signal (for example, SS block or CSI-RS) used as a measurement object of the RSRP used for calculation of a path loss.

For example, in a case that the information for indicating the signal waveform indicates the DFT-S-OFDM, the terminal apparatus 1 may configure the path loss reference used for the transmission power of the random access message 3 to be an SS block, and calculate the path loss based on the RSRP measured from the SS block. Moreover, in a case that the information for indicating the signal waveform indicates the OFDM, the terminal apparatus 1 may configure the path loss reference used for the transmission power of the random access message 3 to be a CSI-RS, and calculate the path loss based on the RSRP measured from the CSI-RS. The RSRP of the SS block may be obtained by measuring the SSS included in the SS block.

The downlink path loss may be calculated based on the transmission power (transmission power of the base station apparatus 2) of the (downlink) path loss reference (for example, SS block or CSI-RS) and the RSRP (measurement result of the path loss reference in the terminal apparatus 1).

The uplink path loss may be calculated based on the transmission power (transmission power of the terminal apparatus 1) of the (uplink) path loss reference (for example, SRS) and the RSRP (measurement result of the path loss reference in the base station apparatus 2).

It may be determined whether the path loss reference used for the transmission power of the random access message 3 is identical to the path loss reference used for the transmission power of the random access message 1, based on whether the information for indicating the signal waveform is the DFT-S-OFDM or the OFDM.

In a case that the first system information includes multiple CSI-RS configurations, the uplink grant included in the random access message 2 (i.e., random access response grant) may include information for indicating the path loss reference. Whether the information for indicating the path loss reference is included in the random access response grant may be indicated by the first system information.

For example, in a case that the information for indicating the path loss reference includes two bits (that is, four indices), an ID (CSI-RS-ID) for identifying the CSI-RS configuration may be assigned to each of the indices 0 to 3. Moreover, an ID (SS block ID) for identifying the SS block configuration may be assigned to each of the indices 0 to 3. Moreover, one of the indices 0 to 3 may indicate that a path loss used for the transmission power of the random access message 3 is calculated by using the same path loss reference as the path loss reference used for the transmission power of the random access message 1. Moreover, the indices 0 to 3 may correspond to measurement results of the RSRP of the CSI-RS. For example, the index 0 may indicate that the CSI-RS with the best measurement result is selected as the path loss reference. The index 1 may indicate that the CSI-RS with the second best measurement result is selected as the path loss reference. The indices 2 and 3 may indicate that the CSI-RS with the third best measurement result and the CSI-RS with the fourth best measurement result are selected as the path loss reference. Moreover, one of the indices 0 to 3 may indicate that the value given based on the RSRP measured from the $N_{ss}$ best SS blocks is selected as the path loss reference. Moreover, one of the indices 0 to 3 may indicate that the mean value of the RSRP measured from the $N_{ss}$ best SS blocks is used as the path loss value. Moreover, one of the indices 0 to 3 may indicate that the value given based on the RSRP measured from the $N_{csi}$ best CSI-RS is used as the path loss value. Moreover, one of the indices 0 to 3 may indicate that the mean value of the RSRP measured from the $N_{csi}$ best CSI-RS is used as the path loss value. $N_{ss}$ and/or $N_{csi}$, each of which is an integer equal to or larger than one, may be notified by the MIB and/or the first system information. $N_{ss}$ may be given based on at least the period of the SS block, and/or the total number of SS blocks configured during a predetermined time period. The mean value of multiple RSRPs may be a mean value to which a predetermined weight is applied. Moreover, one of the indices 0 to 3 may indicate that a path loss used for the transmission power of the random access message 3 is calculated, by using, as the path loss reference, the CSI-RS mapped in a shared manner with the path loss reference used for the transmission power of the random access message 1.

For example, in a case that the information for indicating the path loss reference includes a single bit (i.e., two indices), the CSI-RS-ID may be assigned to each of the indices 0 and 1. Moreover, one of the indices 0 and 1 may indicate that a path loss to be used for the transmission power of the random access message 3 is calculated by using the same path loss reference as the path loss reference used for the transmission power of the random access message 1. Moreover, the indices 0 and 1 may correspond to the measurement results of the RSRP of the CSI-RS. Moreover, one of the indices 0 and 1 may indicate that the path loss to be used in the transmission power of the random access message 3 is calculated, by using the CSI-RS mapped in a shared manner with the path loss reference used for the transmission power of the random access message 1 as the path loss reference.

Although cases in which information for indicating the path loss reference is one bit and two bits are described, the number of bits constituting the information for indicating the path loss reference may be determined based on the total number of CSI-RS configurations or the maximum value of the CSI-RS-ID included in the first system information.

Moreover, whether the information for indicating the path loss reference is included in the random access response grant may be indicated by the first system information.

Moreover, whether the information for indicating the path loss reference is included in the random access response grant may be determined regardless of the information for indicating the signal waveform.

For example, in a case that the first system information includes a configuration of multiple SS blocks and/or a configuration of the CSI-RS, the information for indicating the path loss reference may be included in the random access response grant. Moreover, in a case that the first system information does not include a configuration of the SS block and/or a configuration of the CSI-RS, the information for indicating the path loss reference may not be included in the random access response grant.

According to the present embodiment, difference in path loss references may imply that the type of downlink reference signal (SS blocks, CSI-RS) used for the path loss references is different. Moreover, difference in path loss references may imply that the index, time-frequency resource, or configuration of downlink reference signal used for the path loss references is different.

Next, uplink power control for each physical channel according to the present embodiment will be described.

The transmission power of the PRACH and the random access message 1 is set based on the target power of the PRACH and the power ramp-up step, and the number of transmissions of the PRACH. The transmission power of the PRACH increases based on the power ramp-up step and the number of transmissions in a case that the PRACH is not successful in the random access procedure. The target power of PRACH and the power ramp-up step are configured as higher-layer parameters. The higher-layer parameters may be configured for each cell.

The transmission power of the PUSCH and the random access message 3 is set based on the bandwidth (number of resource blocks) allocated to the PUSCH, the reference power of the PUSCH, and the terminal apparatus specific power of the PUSCH, as well as the compensation factor of the PUSCH, the downlink path loss, the downlink path loss, and the correction value of the TPC command of the PUSCH. The reference power of the PUSCH, the terminal apparatus specific power of the PUSCH, and the compensation factor of the downlink path loss are configured as higher-layer parameters. The higher-layer parameters may be configured for each type of uplink grant, for each cell, and for each uplink subframe set.

The transmission power of the PUCCH is set based on the bandwidth (number of resource blocks) allocated to the PUCCH, the reference power of the PUCCH, and the terminal apparatus specific power of the PUCCH, as well as the compensation factor of the downlink path loss, the power offset based on the PUCCH format, the downlink path loss, and the correction value of the TPC command of the PUCCH. The reference power of the PUCCH, the terminal apparatus specific power of the PUCCH, the power offset based on the PUCCH format, and the compensation factor of the downlink path loss are configured as higher-layer parameters. The higher-layer parameters may be configured for each cell group.

The power of the PUSCH and the PUCCH is adjusted based on TPC commands corresponding to respective physical channels thereof.

Next, a reset procedure of the TPC accumulation used for uplink transmission power according to the present embodiment will be described.

The TPC accumulation for the PUSCH in a single serving cell is reset in a case that the terminal apparatus specific power of the PUSCH for the serving cell is changed by a higher layer, or in a case that the terminal apparatus 1 has received a random access message for the serving cell.

The TPC accumulation for the PUCCH is reset in a case that the terminal apparatus specific power of the PUCCH is changed by a higher layer, or in a case that the terminal apparatus 1 has received a random access message for the primary cell.

In a case that the path loss references of the random access message 1 and the random access message 3 are different in a single serving cell, the initial value of the power control adjustment value used for the transmission power of the random access message 3 need not include the power adjustment value (power ramp-up value) obtained from the power ramp-up of the random access message 1 and the number of transmissions of the PRACH. That is, the initial value of the power control adjustment value used for the transmission power of the random access message 3 may be based on the correction value obtained by the TPC command included in the random access response grant. In other words, the power adjustment value obtained from the random access message 1 may be reset in a case that the path loss references of the random access message 1 and the random access message 3 are different.

In a case that the TPC command is included in the random access message 2, the granularity of the correction value of the transmission power indicated by the TPC command may vary based on at least the signal waveform configured for transmission of the random access message 3. In a case that the TPC command is included in the random access message 2, the table of transmission power correction values indicated by the TPC command may vary based on at least the signal waveform configured for transmission of the random access message 3. In a case that the TPC command is included in the random access message 2, the number of bits of the TPC command may be different based on at least the signal waveform configured for transmission of the random access message 3.

In a case that multiple random access response grants have been detected in a certain time period, the TPC accumulation may be performed for each TPMI in a case that the detected random access response grants respectively correspond to different TPMIs.

In a case that the signal waveform used for transmission of the PUSCH and/or the PUCCH varies and the TPC accumulation is being performed in a single serving cell, the terminal apparatus 1 may reset the power control adjustment value used for the transmission power of the PUSCH and/or the PUCCH. That is, in this case, the terminal apparatus 1 may reset the TPC accumulation.

For example, in a single serving cell, in a case that the signal waveform used for the PUSCH varies between the n-th (re)transmission and the (n+1)-th (re)transmission of the PUSCH, that is, in a case that the signal waveform used for the PUSCH is configured to a different signal waveform, the TPC accumulation from the first to the n-th transmission of the PUSCH may be reset.

For example, in a single serving cell, in a case that the path loss reference used for transmission power of the PUSCH varies between the n-th (re)transmission and the (n+1)-th (re)transmission of the PUSCH, that is, in a case that the path loss reference used for the transmission power of the PUSCH is configured to a different path loss reference, the TPC accumulation from the first to the n-th transmission of the PUSCH may be reset.

Whether to perform the TPC accumulation may be configured for each cell, for each physical channel, for each subframe set, or for each Transmission Precoding Matrix Indicator (TPMI). The TPMI may be information for indicating a transmission precoding or a transmission beam.

For example, in a case that the TPMI used for transmission of the PUSCH varies between the n-th (re)transmission and the (n+1)-th (re)transmission of the PUSCH, i.e., in a case that the TPMI used for the transmission of the PUSCH is configured to a different TPMI, in a single serving cell, the TPC accumulation from the first to the n-th transmission of the PUSCH may be reset.

Moreover, in a single serving cell, in a case that detection of the PDCCH has failed a predetermined number of times in one of multiple control resource sets, and accordingly an SR is transmitted via the PRACH or the PUCCH, the terminal apparatus 1 may reset the power control adjustment value used for the transmission power of the PUSCH scheduled by the PDCCH in the one control resource set. That is, in a case that the PDCCH scheduling the PUSCH cannot be detected in a certain control resource set, the terminal apparatus 1 may transmit the SR by using the PRACH or the PUCCH, based on the configuration of the higher-layer parameter, and reset the TPC accumulation for the PUSCH at the same time.

In such a case, the TPMI used for transmission of the SR of the PRACH or the PUCCH may be identical to the TPMI of the PUSCH. In such a case, the TPMI used for transmission of the SR of the PRACH or the PUCCH may be different from the TPMI of the PUSCH.

Moreover, in such a case, the terminal apparatus 1 need not reset the TPC accumulation until a random access response message (random access message 2) is received, provided that the TPMI used for transmission of the SR of the PRACH or the PUCCH is identical to the TPMI of the PUSCH.

Moreover, in such a case, the terminal apparatus 1 may reset the TPC accumulation, provided that the TPMI used for transmission of the SR of the PRACH or the PUCCH is different from the TPMI of the PUSCH.

Here, the conditions in which the signal waveform used for transmission of the PUSCH and/or the PUCCH varies may include at least one of the following conditions.

(E0) The number of transmission ports is equal to or larger than a predetermined number (E1) The number of transmission ports is smaller than a predetermined number (E2) The number of layers is equal to or larger than a predetermined number (E3) The number of layers is smaller than a predetermined number (E4) The signal waveform is changed or reconfigured based on the higher-layer parameter/DCI (E5) Whether frequency selection precoding is configured Next, a reference of downlink path loss used for an uplink transmission power in a case that interworking between different Radio Access Technologies (RATs) (for example, between NR and LTE) is performed, will be described. The interworking between different RATs may include performing communication with a single terminal apparatus by using different RAT cells. Each of the multiple cells of different RATs may constitute a same RAT cell group.

In a case that uplink and downlink carrier frequencies in the NR are significantly different, the uplink path loss and the downlink path loss between the terminal apparatuses 1 and the base station apparatus of the NR (i.e., gNB) may be completely different due to the difference in frequency. In this case, setting the uplink transmission power by using the downlink path loss in the terminal apparatus 1 may result in setting a value larger than the actual necessary transmission power.

In such a case, the uplink transmission power may be set by using at least one of the following parameters, in order to appropriately set the uplink transmission power.

(C0) Power offset value corresponding to uplink carrier frequency and downlink carrier frequency (C1) Uplink path loss value based on SRS (i.e., path loss value measured in gNB)

(C2) Information relating to the configuration of LTE CRS of carrier frequency equal or close to uplink carrier frequency of NR (for example, subcarrier spacing, resource allocation information, or the like of CRS)

(C3) Information relating to RRM measurement of carrier frequency of NR with carrier frequency equal or close to uplink carrier frequency of NR (configuration of SS block, configuration of CSI-RS)

(C4) Information for indicating whether to configure, as path loss reference, serving cell of LTE in uplink power control configuration for serving cell of uplink carrier frequency of NR Moreover, in C2, the information relating to the configuration of the CRS may be configured by the gNB. In a case that a resource element of the CRS is indicated based on information relating to the configuration of the CRS, the terminal apparatus 1 need not have the uplink resource and/or the downlink resource of the NR mapped on the resource element, or may perform a transmission process or a reception process on the assumption that the uplink resource and/or the downlink resource of the NR is not mapped on the resource element.

In C2, the gNB may notify the terminal apparatus 1 of the configuration information for RSRP measurement at the downlink carrier frequency of the LTE.

In C2, at least one or more of the following parameters may be configured for the terminal apparatus 1 to measure the RSRP based on the CRS at the downlink carrier frequency of the LTE.

(D0) Downlink carrier frequency of the LTE (carrier frequency)

(D1) Measurement bandwidth (D2) Whether to configure a resource element for antenna port 1

(D3) Power offset for carrier frequency of (D0)

(D4) Subcarrier spacing of CRS (D5) Configuration of cell ID of LTE or frequency resource of CRS (D6) Configuration of time resource of CRS (D7) CRS measurement period or transmission period, subframe pattern That is, in C2, the terminal apparatus 1 may use the CRS at the LTE downlink carrier frequency within a predetermined range of the uplink carrier frequency of the NR (that is, carrier frequencies of different RATs) to calculate the downlink path loss used for the transmission power at the uplink carrier frequency of the NR, in a case that the configuration relating to the tight interworking is configured in the NR and the LTE, and in a case that the uplink and downlink carrier frequencies of the NR are significantly different.

Moreover, in C3, at least one or more of the following parameters may be configured for the terminal apparatus 1 to measure the RSRP based on the CSI-RS or the SS blocks at the downlink carrier frequency of the NR.

(F0) Downlink carrier frequency (F1) Measurement bandwidth (F2) Whether antenna port used for measurement is added (F3) Power offset for carrier frequency of (F0)

(F4) Subcarrier spacing of CRS (F5) Configuration of frequency resource of CSI-RS/SS block (F6) Configuration of time resource of CSI-RS/SS block (F7) CSI-RS/SS block measurement period or transmission period, subframe pattern In C4, the terminal apparatus 1 may measure the RSRP by using the CRS in the serving cell of the LTE in a case that the path loss reference used for the uplink transmission power of the NR is configured to the LTE serving cell, whereas the terminal apparatus 1 may measure the path loss or the RSRP by using one of C0 to C3 in a case that the path loss reference used for the uplink transmission power of the NR is not configured to the LTE serving cell.

As thus described, the terminal apparatus 1 may appropriately set the uplink transmission power based on the path loss reference.

Figure 3:
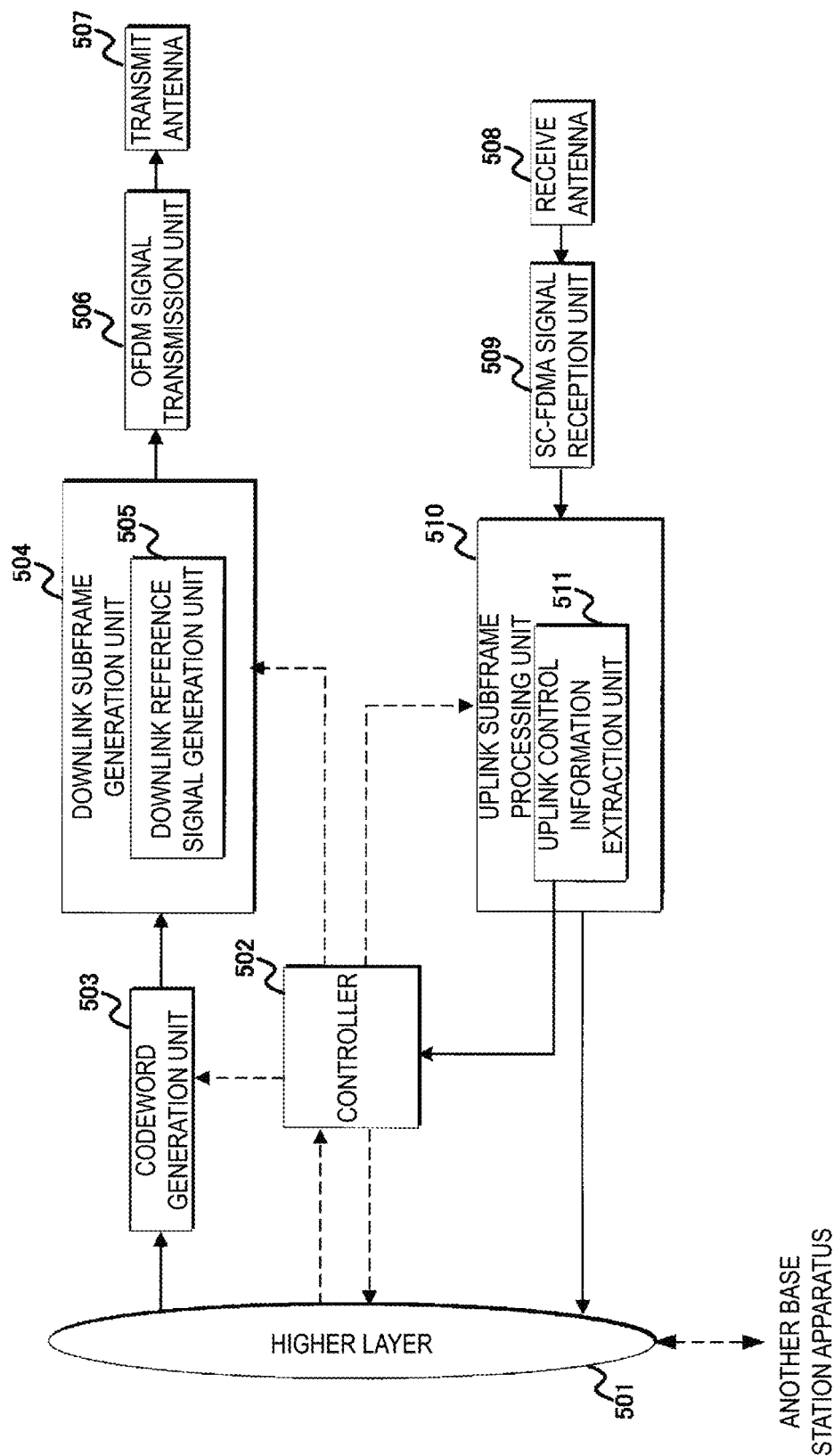
FIG. 3 is a diagram illustrating an example of a block configuration of a base station apparatus 2 according to the first embodiment.

FIG. 3 is a schematic diagram illustrating an example of a block configuration of a base station apparatus 2 according to the present embodiment. The base station apparatus 2 includes a higher-layer (higher-layer control information notification unit) 501, a controller (base station controller) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA (DFT-S-OFDM) signal reception unit (channel state measurement unit and/or CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit/HARQ-ACK acquisition unit/SR acquisition unit) 511. The SC-FDMA signal reception unit 509 also serves as a measurement unit of received signals, Clear Channel Assessment (CCA), and interference noise power. The SC-FDMA signal reception unit 509 may be an OFDM signal reception unit, or may include an OFDM signal reception unit, in a case that the terminal apparatus 1 supports transmission of OFDM signals. Although not illustrated, the base station apparatus 2 may include a transmission unit configured to transmit a Timing Advance (TA) command.

The downlink subframe generation unit 504 may be a downlink Transmit Time Interval (TTI) generation unit or may include a downlink TTI generation unit. Moreover, the downlink TTI generation unit may generate a physical channel and/or a physical signal constituting the downlink TTI. In other words, the downlink subframe generation unit 504 including the downlink TTI generation unit may generate a sequence for the physical channel and/or the physical signal to be transmitted. The downlink subframe generation unit 504 including the downlink TTI generation unit may map the generated sequence to the physical resource. The same may go for uplink. The downlink subframe generation unit 504 includes a downlink slot generation unit. In other words, the downlink subframe generation unit 504 may generate the physical channel and/or physical signal to be transmitted in the downlink slot. Moreover, the downlink subframe generation unit 504 may include a downlink mini-slot generation unit. In other words, the downlink subframe generation unit 504 may generate the physical channel and/or physical signal to be transmitted in the downlink mini-slot.

The uplink subframe processing unit 510 may include an uplink slot processing unit. In other words, the uplink subframe processing unit 510 may perform processing of the physical channel and/or physical signal transmitted in the uplink slot. Moreover, the uplink subframe processing unit 510 may include an uplink mini-slot processing unit. In other words, the uplink subframe processing unit 510 may perform processing of the physical channel and/or physical signal to be transmitted in the uplink mini-slot.

Figure 4:
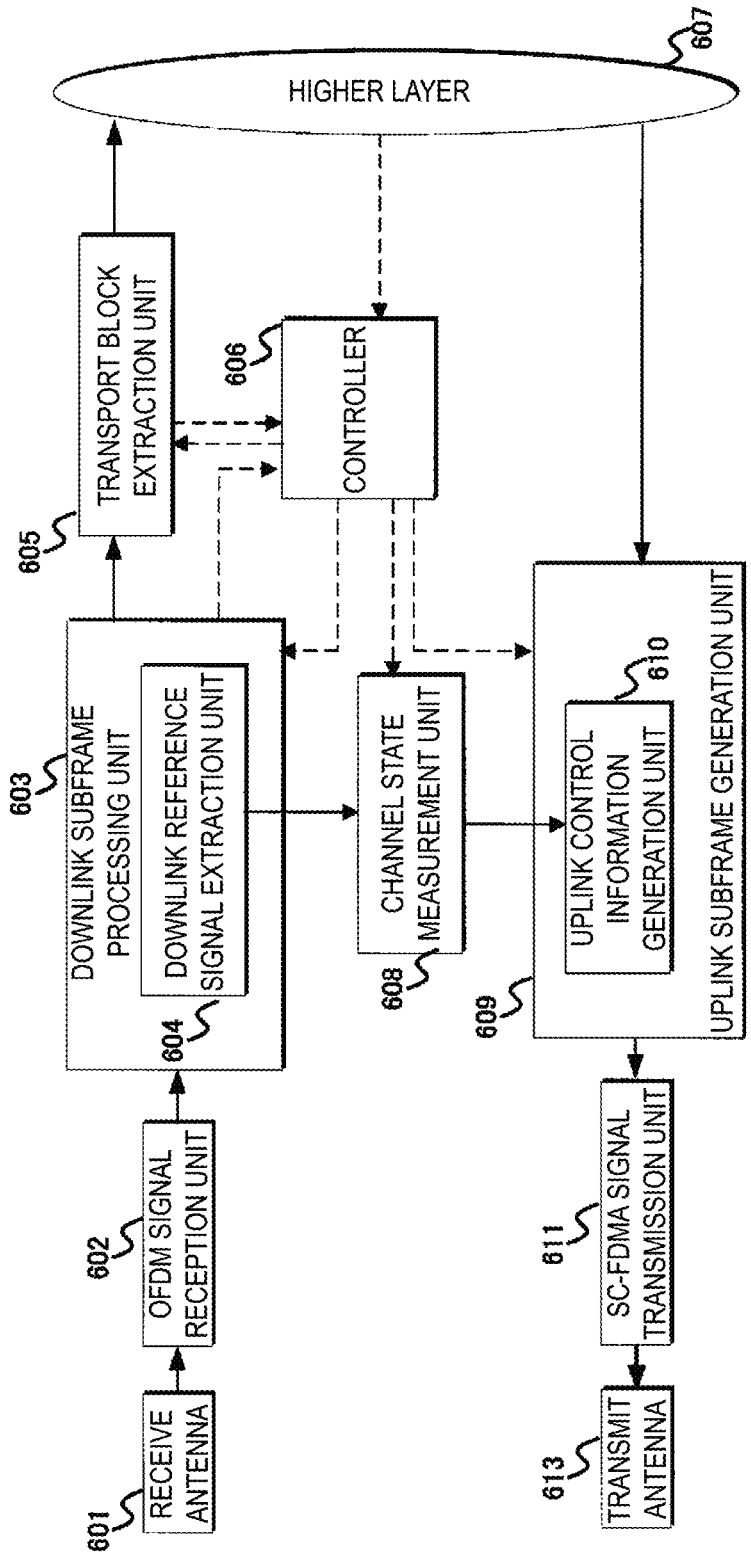
FIG. 4 is a diagram illustrating an example of a block configuration of a terminal apparatus 1 according to the first embodiment.

FIG. 4 is a schematic diagram illustrating an example of a block configuration of a terminal apparatus 1 according to the present embodiment. The terminal apparatus 1 has a receive antenna (terminal receive antenna) 601, an OFDM signal reception unit (downlink reception unit) 602, a downlink subframe processing unit 603, a transport block extraction unit (data extraction unit) 605, a controller (terminal controller) 606, a higher layer (higher-layer control information acquisition unit, higher-layer processing unit) 607, a channel state measurement unit (CSI generation unit) 608, an uplink subframe generation unit 609, an SC-FDMA signal transmission units (UCI transmission units) 611 and 612, and transmit antennas (terminal transmit antennas) 613 and 614. The downlink subframe processing unit 603 includes a downlink Reference Signal extraction unit 604. The downlink subframe processing unit 603 may be a downlink TTI processing unit. The downlink subframe processing unit 603 may include a downlink slot processing unit. In other words, the downlink subframe processing unit 603 may perform processing of the physical channel and/or physical signal to be transmitted in the downlink slot. The downlink subframe processing unit 603 may include a downlink mini-slot processing unit. In other words, the downlink subframe processing unit 603 may perform processing of the physical channel and/or physical signal to be transmitted in the downlink mini-slot. Moreover, the uplink subframe generation unit 609 includes an uplink control information generation unit (UCI generation unit) 610. The OFDM signal reception unit 602 also serves as a measurement unit of received signals, CCA, and interference noise power. In other words, RRM measurement may be performed in the OFDM signal reception unit 602. In a case that the terminal apparatus supports transmission of OFDM signals, the SC-FDMA signal transmission unit may be the OFDM signal transmission unit, or may include the OFDM signal transmission unit.

The uplink subframe generation unit 609 may be an uplink TTI generation unit or may include an uplink TTI generation unit. The uplink TTI generation unit may generate a physical channel and/or a physical signal constituting the uplink TTI. In other words, the uplink subframe generation unit 609 including the uplink TTI generation unit may generate a sequence for the physical channel and/or the physical signal to be transmitted. The uplink subframe generation unit 609 including the uplink TTI generation unit may map the generated sequence to the physical resource. Moreover, the uplink subframe generation unit 609 may include an uplink slot generation unit. In other words, the uplink subframe generation unit 609 may generate the physical channel and/or physical signal to be transmitted in the uplink slot. The uplink subframe generation unit 609 may include an uplink mini-slot generation unit. In other words, the uplink subframe generation unit 609 may generate the physical channel and/or physical signal to be transmitted in the uplink mini-slot. The terminal apparatus 1 may include a power control unit for controlling/setting the transmission power of the uplink signal. Although not illustrated, the terminal apparatus 1 may include a measurement unit for measuring a time difference between reception and transmission of the terminal apparatus 1. The terminal apparatus 1 may include a transmission unit configured to report the measurement result of the time difference.

In FIG. 3 and FIG. 4, respectively, the higher layer may include a Medium Access Control (MAC) layer, a Radio Link Control (RLC) layer, a Packet Data Convergence Protocol (PDCP) layer, and a Radio Resource Control (RRC) layer. The higher layer may also be referred to as a higher-layer processing unit.

The RLC layer performs Transparent Mode (TM) data transmission to the higher layer (for example, PDCP layer or RRC layer), Unacknowledged Mode (UM) data transmission, and Acknowledged Mode (AM) data transmission including an indication indicating that transmission of the higher-layer Packet Data Unit (PDU) has succeeded. Moreover, data transmission to the lower layer is performed, and a transmission opportunity, together with the total size of the RLC PDU transmitted in the transmission opportunity is notified to the lower layer.

The RLC layer supports a function relating to transmission of the higher-layer PDU, a function relating to error correction via an Automatic Repeat reQuest (ARQ) (only for AM data transmission), a function relating to combination/division/reconstruction of the RLC Service Data Unit (SDU) (only for UM and AM data transmission, a function relating to redivision of the RLC data PDU (only for AM data transmission), a function relating to sorting of the RLC data PDU (only for AM data transmission), a function relating to duplication detection (only for UM and AM data transmission), a function relating to discarding of RLC SDU (only for UM and AM data transmission), a function relating to re-establishment of the RLC, and a function relating to protocol error detection (only for AM data transmission).

First, a flow of downlink data transmission and/or reception will be described with reference to FIG. 3 and FIG. 4. In the base station apparatus 2, the controller 502 holds an Modulation and Coding Scheme (MCS) for indicating the modulation scheme, the coding rate, or the like in downlink; downlink resource allocation for indicating the RB used for data transmission; and information used for HARQ control (redundancy version, HARQ process number, and New Data Indicator (NDI), and controls the codeword generation unit 503 and the downlink subframe generation unit 504 based on these parameters/information. The downlink data (also referred to as a downlink transport block, downlink shared data, downlink shared transport block) transmitted from the higher layer 501 is subjected to processing such as error correction coding and rate matching, under the control by the controller 502 in the codeword generation unit 503, and a codeword is generated. Two codewords at maximum are transmitted at the same time in a single subframe of a single cell. In the downlink subframe generation unit 504, a downlink subframe/downlink slot/downlink mini-slot is generated according to the indication from the controller 502. First, the codeword generated in the codeword generation unit 503 is converted into a modulation symbol sequence through a modulation process, such as Phase Shift Keying (PSK) modulation and Quadrature Amplitude Modulation (QAM). Moreover, the modulation symbol sequence is mapped to REs of some RBs, and a downlink subframe/downlink slot/downlink mini-slot for each antenna port is generated through a precoding process. On this occasion, a transmission data sequence transmitted from the higher layer 501 includes higher-layer control information, which is control information in the higher-layer (for example, dedicated (individual) RRC signaling). Moreover, in the downlink Reference Signal generation unit 505, a downlink Reference Signal is generated. The downlink subframe generation unit 504 maps the downlink reference signal to the RE in the downlink subframe/downlink slot/downlink mini-slot according to the indication from the controller 502. The downlink subframe/downlink slot/downlink mini-slot generated by the downlink subframe generation unit 504 is modulated to an OFDM signal in the OFDM signal transmission unit 506, and transmitted via the transmit antenna 507. Although a configuration including one OFDM signal transmission unit 506 and one transmit antenna 507 is provided as an example here, another configuration may include multiple OFDM signal transmission units 506 and transmit antennas 507 in a case that downlink subframes are transmitted by using multiple antenna ports.

Moreover, the downlink subframe generation unit 504 may also have a capability of generating a physical-layer downlink control channel, such as a physical control channel/physical shared channel, and mapping it to the RE of the downlink slot and/or the downlink mini-slot in the downlink subframe. Multiple base station apparatuses each transmit a downlink slot or a downlink mini-slot included in an individual downlink subframe.

In the terminal apparatus 1, the OFDM signal is received by the OFDM signal reception unit 602 via the receive antenna 601, and an OFDM demodulation process is performed on the received signal.

The downlink subframe processing unit 603 first detects a physical-layer downlink control channel such as a physical control channel. More specifically, the downlink subframe processing unit 603 performs decoding on the assumption that the physical control channel has been transmitted in a region to which the physical control channel/physical shared channel is allocated, and checks preliminarily added Cyclic Redundancy Check (CRC) bits. In other words, the downlink subframe processing unit 603 monitors the physical control channel/physical shared channel. In a case that the CRC bits matches an ID which has been preliminarily assigned by the base station apparatus (a terminal-specific identifier (UEID), such as a Cell-Radio Network Temporary Identifier (C-RNTI) and a Semi-Persistent Scheduling-C-RNTI (SPS-C-RNTI), that is assigned to a terminal, or a Temporary C-RNTI), the downlink subframe processing unit 603 recognizes that the physical control channel/physical shared channel has been detected and extracts the physical shared channel by using DCI included in the detected physical control channel.

The controller 606 holds an MCS for indicating a modulation scheme, a coding rate, and the like in the downlink based on the control information, downlink resource allocation for indicating a RB to be used for downlink data transmission, and information to be used for HARQ control, and controls the downlink subframe processing unit 603, the transport block extraction unit 605, and the like based on these parameters/information. More specifically, the controller 606 controls so as to perform an RE demapping process, a demodulation process, and the like that correspond to an RE mapping process and a modulation process in the downlink subframe generation unit 504. The PDSCH extracted from the received downlink subframe is transmitted to the transport block extraction unit 605. Moreover, the downlink reference signal extraction unit 604 in the downlink subframe processing unit 603 extracts the DLRS from the downlink subframe/downlink slot/downlink mini-slot.

The transport block extraction unit 605 performs a rate matching process, an error correction decoding, and the like that correspond to a rate matching process and an error correction coding in the codeword generation unit 503, and a transport block is extracted and transmitted to the higher layer 607. The transport block includes the higher-layer control information, and the higher layer 607 notifies the controller 606 of a required physical-layer parameter, based on the higher-layer control information. Multiple base station apparatuses 2 respectively transmit individual downlink subframes/downlink slots/downlink mini-slots, which are received by the terminal apparatus 1, and therefore the above-described process may be performed on each of the downlink subframes/downlink slots/downlink mini-slots for each of the multiple base station apparatuses 2. On this occasion, the terminal apparatus 1 may or may not recognize that multiple downlink subframes/downlink slots/downlink mini-slots are transmitted from the multiple base station apparatuses 2. In a case that the recognition is not performed, it suffices for the terminal apparatus 1 to merely recognize that multiple subframes/downlink slots/downlink mini-slots are transmitted in multiple cells. Moreover, the transport block extraction unit 605 determines whether the transport block has been detected correctly and transmits a result of the determination to the controller 606.

Here, the transport block extraction unit 605 may include a buffer unit (soft buffer unit). The buffer unit is capable of temporarily storing information of the extracted transport block. For example, the transport block extraction unit 605, in a case of receiving a same transport block (retransmitted transport block), attempts to combine (compose) the data for the transport block temporarily stored in the buffer unit with the newly received data and decode the combined data, provided that decoding of the data for the transport block has not succeeded. In a case that the temporarily stored data is no longer necessary, or satisfies a predetermined condition, the buffer unit flushes the data. The condition of the data to be flushed may vary according to the type of transport block corresponding to the data. The buffer unit may be prepared for each type of data. For example, a message 3 buffer or a HARQ buffer may be prepared as the buffer unit, or the buffer unit may be prepared for each layer such as L1/L2/L3. Here, flushing of information/data implies flushing a buffer storing information or data therein.

Next, a flow of uplink signal transmission and/or reception will be described. In the terminal apparatus 1, a downlink Reference Signal extracted by the downlink Reference Signal extraction unit 604 is transmitted to the channel state measurement unit 608 under the indication from the controller 606, the channel state and/or interference is measured by the channel state measurement unit 608, and further CSI is calculated based on the measured channel state and/or interference. Moreover, the channel state measurement unit 608 may measure the intensity of a beam from the base station apparatus 2, or detect a resource corresponding to the beam. The controller 606 indicates to the uplink control information generation unit 610 to generate an HARQ-ACK (DTX (not transmitted yet), ACK (detection succeeded), or NACK (detection failed)) and map the resultant to a downlink subframe based on a result of the determination of whether the transport block is correctly detected. The terminal apparatus 1 performs the processes on the downlink subframe/downlink slot/downlink mini-slot for each of the multiple cells. In the uplink control information generation unit 610, a PUCCH including the calculated CSI and/or HARQ-ACK, or a control channel/shared channel corresponding to the PUCCH is generated. In the uplink subframe generation unit 609, the physical shared channel including the uplink data transmitted from the higher-layer 607 and the physical control channel generated by the uplink control information generation unit 610 are mapped to the RB of the uplink slot or the uplink mini-slot in the uplink subframe, and the uplink slot or the uplink mini-slot are generated.

The SC-FDMA signal is received by the SC-FDMA signal reception unit 509 via the receive antenna 508, and an SC-FDMA demodulation process is performed. The uplink subframe processing unit 510 extracts the RB to which the physical control channel is mapped, according to an indication from the controller 502, and the uplink control information extraction unit 511 extracts the CSI included in the physical control channel. The extracted CSI is sent to the controller 502. The CSI is used for control of downlink transmission parameters (MCS, downlink resource allocation, HARQ, transmit beam, receive beam, and the like) by the controller 502. The SC-FDMA signal reception unit may be the OFDM signal reception unit. Moreover, the SC-FDMA signal reception unit may include the OFDM signal reception unit.

A part of the terminal apparatus and/or the base station apparatus described above may be realized by a computer. In such a case, a program for realizing such control functions may be recorded on a computer-readable recording medium to cause a computer system to read the program recorded on the recording medium for execution.

Here, a "computer system" is intended to be a computer system built in the terminal apparatus or the base station apparatus, and include an OS and hardware such as peripheral devices. Moreover, "computer-readable recording medium" may include a portable medium such as a flexible disk, magneto-optical disk, ROM, CD-ROM, or a storage device such as a hard disk built in the computer system.

Furthermore, a "computer-readable recording medium" may include a medium, such as a communication line for transmitting the program via a network such as the Internet or via a communication circuit such as a telephone circuit, that dynamically holds a program for a short period of time, or a medium, such as a volatile memory in the computer system serving as a server or a client in such a case, that holds the program for a certain period of time. Moreover, a "computer-readable recording medium" may be an external memory. Moreover, the above-described program may be one for realizing a part of the functions described above, and further may be one that can realize the above-described functions in combination with programs already recorded in the computer system.

Moreover, the base station apparatus according to the above-described embodiment may be realized as an aggregation (apparatus group) including multiple apparatuses. Each of the apparatuses constituting an apparatus group may include some or all of the functions or functional blocks of the base station apparatus according to the above-described embodiment. The apparatus group is required to have each general function or each general functional block of the base station apparatus. Moreover, the terminal apparatus according to the above-described embodiment is also capable of communicating with the base station apparatus as the aggregation.

Moreover, the base station apparatus according to the above-described embodiment may be the Evolved Universal Terrestrial Radio Access Network (EUTRAN) and/or the NextGen RAN, NR RAN (NG-RAN). Moreover, the base station apparatus 2 according to the above-described embodiment may have some or all of the functions of a higher node relative to the eNB and/or the gNB.

Moreover, some or all of the terminal apparatus and the base station apparatus according to the above-described embodiment may be realized as an LSI, which is typically an integrated circuit, or as a chip set. Each functional block of the terminal apparatus and the base station apparatus may be individually realized as a chip, or some or all of the functional blocks may be integrated into a chip. Moreover, the integrated circuit technique is not limited to LSI, and may be realized as a dedicated circuit or a general-purpose processor. Furthermore, in a case where with advances in semiconductor technology, a circuit integration technology with which an LSI is replaced appears, it is also possible to use an integrated circuit based on the technology.

Moreover, although a cellular mobile station apparatus (cellular phone, mobile apparatus) has been described as an example of the terminal apparatus or the communication apparatus in the above-described embodiments, the present invention is not limited thereto, and may be applied to a terminal apparatus or a communication apparatus of a stationary, or non-mobile electronic apparatus installed indoors or outdoors such as an AV apparatus, kitchen equipment (for example, a refrigerator or a micro-wave oven), a vacuum cleaner or a washing machine, an air-conditioning apparatus, office equipment, a vending a machine, a car-mounted apparatus such as car navigation device, and other household apparatuses.

As has been described above, an aspect of the present invention provides the following characteristics.

(1) A terminal apparatus according to an aspect of the present invention includes: a receiver configured to receive an SS block and/or a CSI-RS; a measurement unit configured to measure an RSRP from the SS block and the CSI-RS; and a transmitter configured to transmit a PRACH and/or a PUSCH, wherein in an initial access, the transmitter calculates, from the RSRP of the SS block at initial access, a downlink path loss used for transmission power of the PRACH and calculates, from the RSRP of the SS block, a downlink path loss used for transmission power of a first PUSCH scheduled by a random access response grant, calculates, from the RSRP of the SS block, a downlink path loss used for transmission power of the PUSCH in a case that a signal waveform for the PUSCH is configured to DFT-S-OFDM based on first information included in first system information indicated by the SS block, and calculates a downlink path loss used for transmission power of the PUSCH from the RSRP of the CSI-RS indicated by second information included in the random access response grant, in a case that the signal waveform for the PUSCH is configured to CP-OFDM based on the first information.

(2) A terminal apparatus according to an aspect of the present invention is the terminal apparatus described above, wherein in a case that multiple random access response grants have been received in a certain time period, the transmitter determines whether to perform accumulation for each of TPC commands for the first PUSCH included in the multiple random access response grants, based on third information included in the first system information.

(3) A terminal apparatus according to an aspect of the present invention is the terminal apparatus described above, wherein in a case that the path loss references used for the downlink path loss are different between the PRACH and the first PUSCH, the transmitter does not apply the power control adjustment value in the PRACH as the initial value for the power control adjustment value in the first PUSCH.

(4) A terminal apparatus according to an aspect of the present invention is the terminal apparatus described above, wherein a sequence used for the first PUSCH is generated based on an index for indicating the SS block or the CSI-RS used to calculate the downlink path loss.

(5) A terminal apparatus according to an aspect of the present invention is the terminal apparatus described above, wherein in a case that multiple SS blocks having different indices are received in a certain time period, measurement results of one or more SS blocks, among the multiple SS blocks, that have good measurement results are averaged to obtain the RSRP of the SS block.

(6) A terminal apparatus according to an aspect of the present invention is the terminal apparatus described above, wherein in a case that the RSRP of the SS block is obtained by averaging the measurement results of more than one SS block, the transmitter performs transmission with the index of the SS block included in the first PUSCH.

(7) A terminal apparatus according to an aspect of the present invention is the terminal apparatus described above, wherein a measurement report of the RSRP of the SS block and/or the RSRP of the CSI-RS is included in the first PUSCH.

(8) A terminal apparatus according to an aspect of the present invention includes: a receiver configured to receive an SS block and/or a CSI-RS; a measurement unit configured to measure an RSRP from the SS block and the CSI-RS; and a transmitter configured to transmit a PRACH and/or a PUSCH, wherein the transmitter determines, in an initial access, which of the SS block or the CSI-RS is to be used as the downlink reference signal of the downlink path loss used for setting the transmission power of the PUSCH scheduled by the random access response grant, based on information for indicating the signal waveform for the PUSCH included in the SS block.

(9) A method according to an aspect of the invention is a method for a terminal apparatus, the method including: receiving an SS block and/or a CSI-RS; measuring an RSRP from the SS block and the CSI-RS; transmitting a PRACH and/or a PUSCH; in an initial access, calculating, from the RSRP of the SS block, a downlink path loss used for transmission power of the PRACH, and calculating, from the RSRP of the SS block, a downlink path loss used for transmission power of a first PUSCH scheduled by a random access response grant; calculating, from the RSRP of the SS block, a downlink path loss used for transmission power of the PUSCH in a case that a signal waveform for the PUSCH is configured to DFT-S-OFDM based on first information included in first system information indicated by the SS block; and calculating a downlink path loss used for transmission power of the PUSCH from the RSRP of the CSI-RS indicated by second information included in the random access response grant in a case that the signal waveform for the PUSCH is configured to CP-OFDM based on the first information.

(10) A method according to an aspect of the present invention is a method for a terminal apparatus the method including: receiving an SS block and/or a CSI-RS; measuring an RSRP from the SS block and the CSI-RS; transmitting a PRACH and/or a PUSCH; and in an initial access, determining which of the SS block or the CSI-RS is to be used as the downlink reference signal of the downlink path loss used for setting the transmission power of the PUSCH scheduled by the random access response grant, based on information for indicating a signal waveform for the PUSCH included in the SS block.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Moreover, a configuration in which components mentioned in the above-described embodiments and exhibiting similar effects are substituted for each other is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

501 Higher layer
502 Controller
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606 Controller
607 Higher layer
608 Channel state measurement unit
609 Uplink subframe generation unit
610 Uplink control information generation unit
611,612 SC-FDMA signal transmission unit
613, 614 Transmit antenna

The invention claimed is:
1. A terminal apparatus comprising:
a receiver configured to receive a synchronization schedule (SS) block including a primary synchronization signal (PSS), a second synchronization signal (SSS) and a physical broadcast channel (PBCH), and/or a channel state information reference signal (CSI-RS);
a measurement unit configured to measure a reference signal receive power (RSRP) from the SS block and/or the CSI-RS; and
a transmitter configured to transmit a physical random access channel (PRACH) and/or a physical uplink shared channel (PUSCH), wherein in a case of an initial access, the transmitter is configured to
set transmission power of the PRACH using a pathloss based on the RSRP measured from only the SS block,
set transmission power of the PUSCH including message 3 using the pathloss based on the RSRP measured from the SS block and/or the CSI-RS, determine, based on configuration information, the RSRP used for the pathloss from among the RSRP measured from the SS block and the RSRP measured from the CSI-RS, wherein the configuration information includes a first parameter for indicating a subcarrier spacing for the PUSCH and a second parameter for indicating a signal waveform for the PUSCH.

2. A method comprising:
receiving a synchronization schedule (SS) block including a primary synchronization signal (PSS), a second synchronization signal (SSS) and a physical broadcast channel (PBCH), and/or a channel state information reference signal (CSI-RS);
measuring a reference signal receive power (RSRP) from the SS block and/or the CSI-RS;
transmitting a physical random access channel (PRACH) and/or a physical uplink shared channel (PUSCH); and
in a case of an initial access, setting transmission power of the PRACH using a pathloss based on the RSRP measured from only the SS block, setting transmission power of the PUSCH including message 3 using the pathloss based on the RSRP measured from the SS block and/or the CSI-RS, determining, based on configuration information, the RSRP used for the pathloss from among the RSRP measured from the SS block and the RSRP measured from the CSI-RS, wherein the configuration information further includes a first parameter for indicating a subcarrier spacing for the PUSCH and a second parameter for indicating a signal waveform for the PUSCH.

\* \* \* \* \*